(12) United States Patent
Yoshida et al.

(10) Patent No.: US 9,742,048 B2
(45) Date of Patent: Aug. 22, 2017

(54) METAL-AIR BATTERY

(71) Applicant: Sharp Kabushiki Kaisha, Osaka-shi, Osaka (JP)

(72) Inventors: Akihito Yoshida, Osaka (JP); Hirotaka Mizuhata, Osaka (JP); Masaki Kaga, Osaka (JP); Tomoharu Arai, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 87 days.

(21) Appl. No.: 14/771,885

(22) PCT Filed: Feb. 25, 2014

(86) PCT No.: PCT/JP2014/054503
§ 371 (c)(1),
(2) Date: Sep. 1, 2015

(87) PCT Pub. No.: WO2014/156433
PCT Pub. Date: Oct. 2, 2014

(65) Prior Publication Data
US 2016/0020498 A1   Jan. 21, 2016

(30) Foreign Application Priority Data

Mar. 25, 2013   (JP) .................. 2013-062281

(51) Int. Cl.
*H01M 12/08* (2006.01)
*H01M 12/02* (2006.01)
(Continued)

(52) U.S. Cl.
CPC ......... *H01M 12/08* (2013.01); *H01M 2/1072* (2013.01); *H01M 12/02* (2013.01); *H01M 12/06* (2013.01)

(58) Field of Classification Search
None
See application file for complete search history.

(56) References Cited

U.S. PATENT DOCUMENTS 3,619,297 A    11/1971   Moran
2001/0009735 A1   7/2001   Yang et al.
(Continued)

FOREIGN PATENT DOCUMENTS

JP   43-020726 B1 *  9/1968
JP   43-20726 B1    9/1968
(Continued)

OTHER PUBLICATIONS

Manual English translation of JP 43-020726 B1.*
Official Communication issued in International Patent Application No. PCT/JP2014/054503, mailed on Apr. 22, 2014.

*Primary Examiner* — Scott J Chmielecki
(74) *Attorney, Agent, or Firm* — Keating & Bennett, LLP

(57) ABSTRACT

The invention provides a metal-air battery in which a metallic electrode can be smoothly inserted into a metal-air battery main body.
The metal-air battery of the invention includes at least one cell. The cell includes an electrolytic tank that stores an electrolytic solution, a metallic electrode that is provided in the electrolytic tank and serves as an anode, at least one air electrode that serves as a cathode, an electrode insertion opening through which the metallic electrode is inserted into the electrolytic tank, and a position adjustment section. The position adjustment section is provided to adjust a position of the metallic electrode through contact between the metallic electrode and the position adjustment section during insertion of the metallic electrode into the electrolytic tank.

12 Claims, 17 Drawing Sheets

(51) Int. Cl.
 *H01M 12/06* (2006.01)
 *H01M 2/10* (2006.01)

(56) References Cited

U.S. PATENT DOCUMENTS

| | | | | |
|---|---|---|---|---|
| 2004/0234843 | A1* | 11/2004 | Skyllas-Kazacos | B60L 11/1879 |
| | | | | 429/105 |
| 2005/0123815 | A1 | 6/2005 | Tsai et al. | |
| 2012/0293110 | A1* | 11/2012 | Frederick | H01M 4/46 |
| | | | | 320/101 |
| 2013/0280623 | A1* | 10/2013 | Yoshida | H01M 12/06 |
| | | | | 429/404 |
| 2015/0104370 | A1* | 4/2015 | Ishikawa | C01B 33/021 |
| | | | | 423/350 |

FOREIGN PATENT DOCUMENTS

| | | |
|---|---|---|
| JP | 57-72561 U | 10/1982 |
| JP | 7-045270 A | 2/1995 |
| JP | 2005-509262 A | 4/2005 |

\* cited by examiner

METAL-AIR BATTERY

TECHNICAL FIELD

The present invention relates to a metal-air battery.

BACKGROUND ART

A metal-air battery has a high energy density, and thus has attracted attention as a next-generation battery. The metal-air battery generates electricity in a state where a metallic electrode containing an electrode active material as a fuel is set as an anode, and an air electrode is set as a cathode.

Examples of a representative metal-air battery include a zinc-air battery in which metal zinc is set as an electrode active material. In the zinc-air battery, it is considered that an electrode reaction similar to the following Chemical Formula 1 progresses in the cathode.

$$O_2 + 2H_2O + 4e^- \rightarrow 4OH^- \quad \text{(Chemical Formula 1)}$$

In addition, it is considered that an electrode reaction similar to the following Chemical Formulae 2 and 3 progresses in the anode.

$$Zn + 4OH^- \rightarrow Zn(OH)_4^{2-} + 2e^- \quad \text{(Chemical Formula 2)}$$

$$Zn(OH)_4^{2-} \rightarrow ZnO + 2OH^- + H_2O \quad \text{(Chemical Formula 3)}$$

In addition, it is considered that metal zinc (Zn) that is the electrode active material is dissolved once in an electrolytic solution in the form of $Zn(OH)_4^{2-}$ along with the progress of the electrode reaction, and when concentration of the ion reaches saturation, the metal zinc settles in the form of ZnO in the electrolytic solution.

When power generation by the metal-air battery continues, the electrode active material contained in the metallic electrode is consumed, and thus it is necessary to supply a new electrode active material to the metal-air battery. As a method of supplying the electrode active material, a method of inserting an anode assembly, in which a plurality of metallic electrodes are connected to each other on a support, into a metal-air battery main body, a method of inserting the metallic electrode into a bag-shaped structure that is provided at the inside of the metal-air battery, a method of inserting a fuel battery into a case-shaped metal-air battery main body, and the like are known (For example, refer to PTL 1, PTL 2, and PTL 3).

CITATION LIST

Patent Literature

PTL 1: Japanese Unexamined Patent Application Publication (Translation of PCT Application) No. 2005-509262

PTL 2: U.S. Patent Application Publication No. 2001/0009735

PTL 3: Japanese Unexamined Patent Application Publication No. 7-45270

SUMMARY OF INVENTION

Technical Problem

However, in the metallic electrode inserting method of the related art, it is necessary to perform positioning between the metal-air battery main body and the metallic electrode before insertion with high accuracy, and thus there is a problem in that time is taken for the insertion of the metallic electrode. In addition, if the positioning is not performed sufficiently, the metal-air battery main body and the metallic electrode may collide with each other during the insertion, and thus the metal-air battery main body or the metallic electrode may be damaged. In addition, the metallic electrode may be bent during the insertion of the metallic electrode into the metal-air battery main body, and thus there is a problem in that an inter-electrode distance varies due to the bending. In addition, when the metallic electrode is not smoothly inserted into the metal-air battery main body, there is a problem in that time is taken before power generation after initiation of the insertion of the metallic electrode into the metallic electrode main body.

The invention has been made in consideration of the above-described circumstances, and provides a metal-air battery capable of smoothly inserting a metallic electrode into a metal-air battery main body.

Solution to Problem

According to the invention, there is provided a metal-air battery including at least one cell, in which the cell includes an electrolytic tank that stores an electrolytic solution, a metallic electrode that is provided in the electrolytic tank and serves as an anode, at least one air electrode that serves as a cathode, an electrode insertion opening through which the metallic electrode is inserted into the electrolytic tank, and a position adjustment section, and the position adjustment section is provided to adjust a position of the metallic electrode through contact between the metallic electrode and the position adjustment section during insertion of the metallic electrode into the electrolytic tank.

Advantageous Effects of Invention

According to the invention, the metal-air battery includes at least one cell, and the cell includes the electrolytic tank that stores an electrolytic solution, a metallic electrode that is provided in the electrolytic tank and serves as an anode, and at least one air electrode that serves as a cathode. Accordingly, it is possible to allow an electromotive force to occur between the metallic electrode and the air electrode in accordance with the progress of an electrode reaction.

According to the invention, the electrode insertion opening, through which the metallic electrode is inserted into the electrolytic tank, is provided. Accordingly, it is possible to supply an electrode active material to the metal-air battery by pulling out a used metallic electrode from the electrolytic tank and by inserting a new metallic electrode into the electrolytic tank.

According to the invention, the position adjustment section, which is provided to adjust the position of the metallic electrode through contact between the metallic electrode and the position adjustment section during insertion of the metallic electrode into the electrolytic tank, is included. Accordingly, it is possible to perform positioning of the metallic electrode in the position adjustment section, and thus it is possible to smoothly and quickly insert the metallic electrode into the electrolytic tank. According to this, it is possible to shorten the amount of time taken to supply the electrode active material to the metal-air battery, and thus it is possible to improve ease of use of the metal-air battery. In addition, it is possible to suppress damage of the metal-air battery during insertion of the metallic electrode, and thus it is possible to prolong the lifespan of the metal-air battery.

According to the invention, since the position adjustment section is provided, it is possible to reliably make an inter-electrode distance between the metallic electrode and the air electrode uniform in a plane. According to this, it is possible to suppress current concentration, and thus it is possible to greatly improve the discharge capacity of the metal-air battery, and it is possible to allow the metal-air battery to have stable discharging characteristics even though the metallic electrode is exchanged.

DESCRIPTION OF EMBODIMENTS

Figure 1:
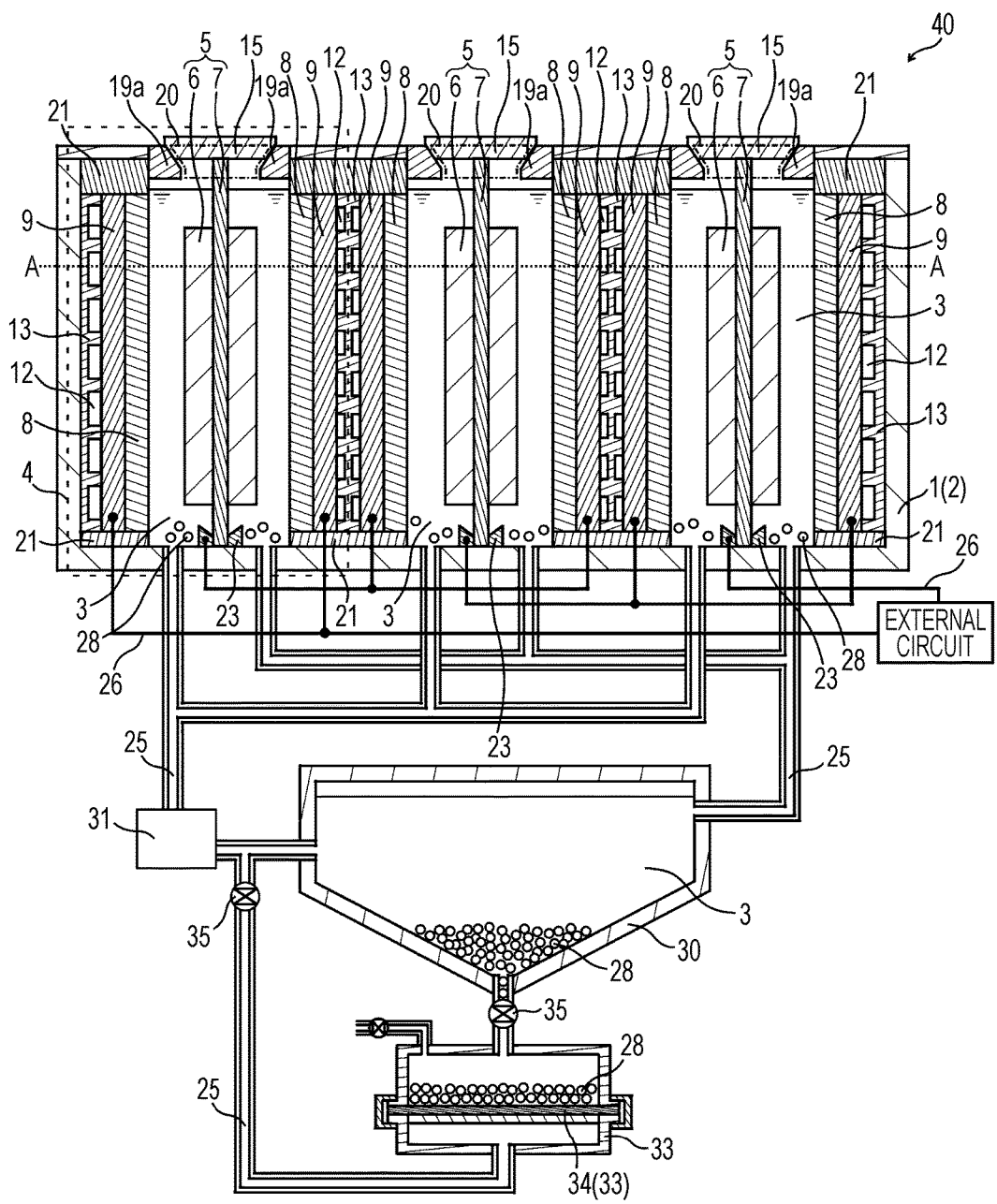
FIG. 1 is a schematic cross-sectional view illustrating a configuration of a metal-air battery of an embodiment of the invention.

A metal-air battery of the invention includes at least one cell. The cell includes an electrolytic tank that stores an electrolytic solution, a metallic electrode that is provided in the electrolytic tank and serves as an anode, at least one air electrode that serves as a cathode, an electrode insertion opening through which the metallic electrode is inserted into the electrolytic tank, and a position adjustment section. The position adjustment section is provided to adjust a position of the metallic electrode through contact between the metallic electrode and the position adjustment section during insertion of the metallic electrode into the electrolytic tank.

In the metal-air battery of the invention, it is preferable that the air electrode is constituted by a pair of air electrodes, and the metallic electrode is disposed at approximately the center between the pair of air electrodes.

According to this configuration, it is possible to make a current distribution between an anode and a cathode uniform, and particularly, it is possible to make the current distribution in an upper and lower direction uniform. According to this, it is possible to increase the discharge capacity of the metal-air battery.

In the metal-air battery of the invention, it is preferable that the position adjustment section constitutes a side wall around the electrode insertion opening, and the side wall has a shape in such a manner that the electrode insertion opening becomes narrower as it goes toward the inside of the electrolytic tank.

According to this configuration, when the metallic electrode and the position adjustment section that constitutes the side wall around the electrode insertion opening come into contact with each other during insertion of the metallic electrode into the electrolytic tank, the metallic electrode slides on the side wall and moves to the central portion of the electrode insertion opening. According to this, it is possible to adjust the position of the metallic electrode.

In the metal-air battery of the invention, it is preferable that the position adjustment section includes a roller that is provided around the electrode insertion opening.

According to this configuration, when the metallic electrode and the roller that is provided around the electrode insertion opening come into contact with each other during insertion of the metallic electrode into the electrolytic tank, the roller rotates, and thus the metallic electrode moves to the central portion of the electrode insertion opening. According to this, it is possible to adjust the position of the metallic electrode.

In the metal-air battery of the invention, it is preferable that the position adjustment section is made of an elastic material, and is provided in a manner capable of being deformed toward the inside of the electrolytic tank.

According to this configuration, the metallic electrode and the position adjustment section come into contact with each other during insertion of the metallic electrode into the electrolytic tank. Accordingly, it is possible to suppress leakage of the electrolytic solution from an upper portion of the electrolytic tank, and thus it is possible to improve stability of the metal-air battery. In addition, after the metallic electrode is pulled out, the position adjustment section plugs the upper portion of the electrolytic tank, and thus it is possible to prevent the electrolytic solution from leaking.

In the metal-air battery of the invention, it is preferable to further include an attachment section into which a part of the metallic electrode is fitted.

According to this configuration, a part of the metallic electrode is fitted into the attachment section, and thus it is possible to fix the metallic electrode in the electrolytic tank.

In the metal-air battery of the invention, it is preferable that a plurality of cells are provided, the attachment section has conductivity, and the attachment section, which is included in one of the plurality of cells, is electrically connected to the air electrode that is included in another cell, or the attachment section that is included in another cell.

According to this configuration, it is possible to connect the plurality of cells in series or in parallel through the attachment section. In addition, the attachment section can be used as a connection terminal, and thus it is possible to reduce the number of components of the metal-air battery, and it is possible to reduce the manufacturing cost of the metal-air battery.

In the metal-air battery of the invention, it is preferable that the attachment section covers a lateral side end of the metallic electrode. The attachment section may cover the entirety of the lateral side end of the metallic electrode or may cover a part of the lateral side end.

According to this configuration, it is possible to suppress current concentration at an anode end during discharging, and thus it is possible to allow a discharging reaction to progress uniformly on the entire surface of the anode. According to this, it is possible to increase the discharge capacity of the metal-air battery.

Hereinafter, an embodiment of the invention will be described with reference to the accompanying drawings. A configuration illustrated in the drawings or in the following description is illustrative only, and the scope of the invention is not limited to the configuration illustrated in the drawings or in the following description.

Configuration of Metal-Air Battery

Figure 2:
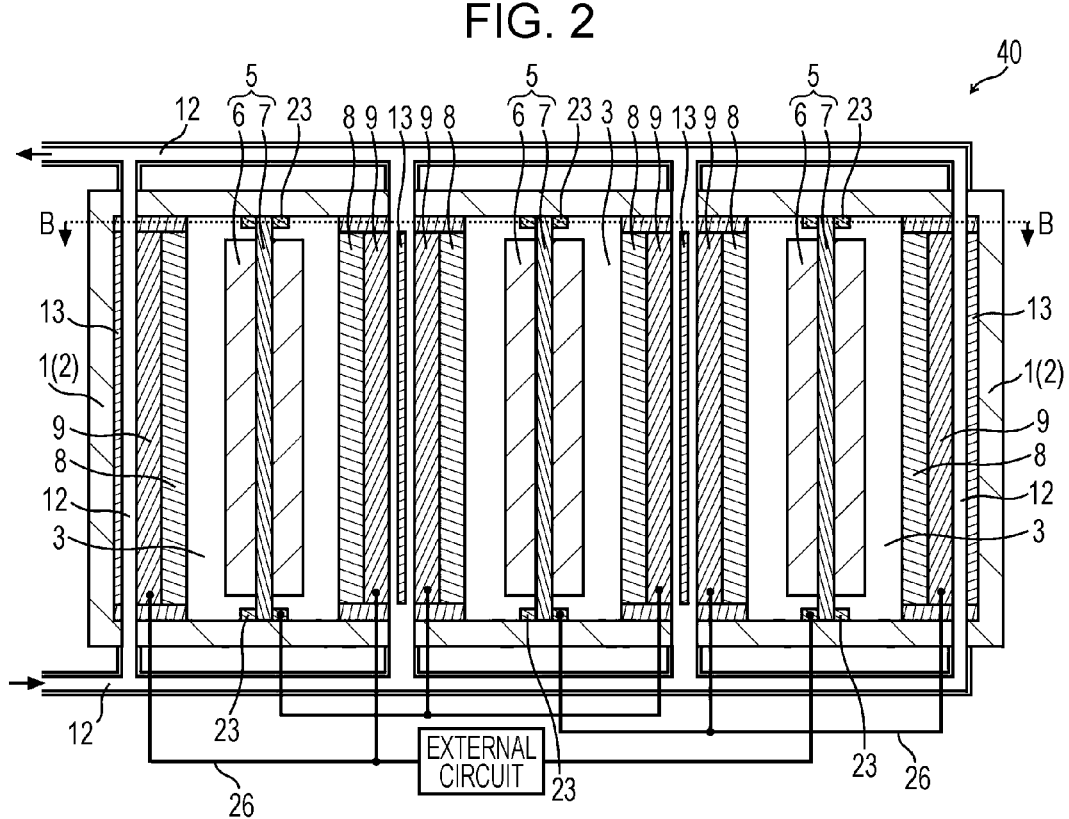
FIG. 2 is a schematic cross-sectional view of the metal-air battery which is taken along dotted line A-A of FIG. 1.
Figure 3:
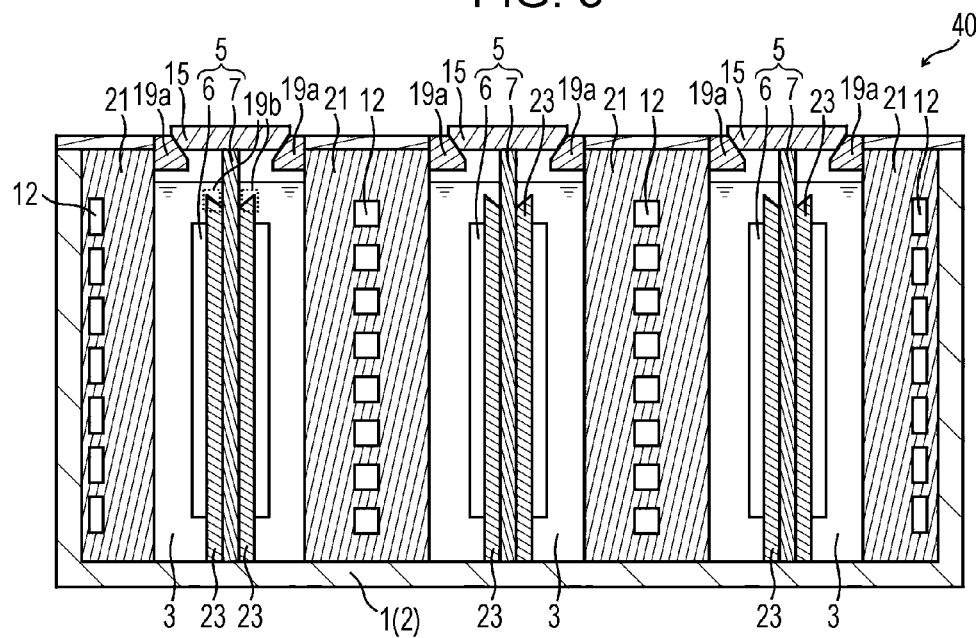
FIG. 3 is a schematic cross-sectional view of the metal-air battery which is taken along dotted line B-B of FIG. 2.

FIG. 1 is a schematic cross-sectional view of the metal-air battery of this embodiment. FIG. 2 is a schematic cross-sectional view of the metal-air battery which is taken along dotted line A-A of FIG. 1, and FIG. 3 is a schematic cross-sectional view of the metal-air battery which is taken along dotted line B-B of FIG. 2. In addition, FIGS. 9, 11, and 17 to 20 are schematic cross-sectional views of the metal-air battery of this embodiment, and FIGS. 6, 7, 12, 13, and 15 are schematic cross-sectional views of the metal-air battery during insertion of the metallic electrode into the electrolytic tank.

A metal-air battery 40 of this embodiment includes at least one cell 4. The cell 4 includes an electrolytic tank 2 that stores an electrolytic solution 3, a metallic electrode 5 that is provided in the electrolytic tank 2 and serves as an anode, at least one air electrode 9 that serves as a cathode, an electrode insertion opening 20 through which the metallic electrode 5 is inserted into the electrolytic tank 2, and a position adjustment section 19. The position adjustment section 19 is provided to adjust a position of the metallic electrode 5 through contact between the metallic electrode 5 and the position adjustment section 19 during insertion of the metallic electrode 5 into the electrolytic tank 2.

In addition, the metal-air battery 40 of this embodiment may include an attachment section 23, an ion exchange membrane 8, or a used active material recovery mechanism.

Hereinafter, description will be given of the metal-air battery 40 of this embodiment.

1. Metal-Air Battery

The metal-air battery 40 of this embodiment is a battery in which the metallic electrode 5 is set as a negative electrode (anode), and the air electrode 9 is set as a positive electrode (cathode). Examples of the metal-air battery 40 include a zinc-air battery, a lithium-air battery, a sodium-air battery, a calcium-air battery, a magnesium-air battery, an aluminum-air battery, an iron-air battery, and the like. In addition, the metal-air battery 40 of this embodiment may be a primary battery.

2. Cell

The cell 4 is a constitutional unit of the metal-air battery 40, and includes an electrode pair including the metallic electrode 5 serving as an anode, and at least one air electrode 9 serving as a cathode. The cell 4 may be provided in such a manner that one air electrode 9 and one metallic electrode 5 are disposed with the electrolytic solution 3 interposed therebetween, or in such a manner that two air electrodes 9 are disposed with one metallic electrode 5 interposed therebetween similar to the metal-air battery 40 illustrated in FIGS. 1 and 2.

In addition, the metal-air battery 40 may have a single cell structure including one cell, or may have a stack structure including a plurality of the cells 4 similar to the metal-air battery 40 illustrated in FIGS. 1 and 2.

In a case where the metal-air battery 40 has the stack structure, the plurality of cells 4 may be connected in series or in parallel. In the metal-air battery 40 illustrated in FIGS. 1 and 2, three cells 4 are connected in series.

In the metal-air battery 40 illustrated in FIGS. 1 and 2, the cells 4 are connected in series with an interconnection on a lower side of the cells 4, but the cells 4 may be connected in series with an interconnection on an upper side of the cells 4, or an interconnection on a lateral side of the cells 4.

3. Electrolytic Tank, Electrolytic Solution

The electrolytic tank 2 is a tank for storing the electrolytic solution 3, and has corrosion resistance with respect to the electrolytic solution. In addition, the electrolytic tank 2 has a structure in which the metallic electrode 5 can be provided therein. In addition, in a case where the metal-air battery 40 includes the plurality of cells 4, the respective cells 4 may have electrolytic tanks 2 different from each other, the electrolytic tanks 2 of the respective cells 4 may communicate with each other due to flowing, or the respective cells 4 may share one electrolytic tank 2. In addition, in the metal-air battery 40 illustrated in FIGS. 1 and 2, the bottom and a part of a side wall of the electrolytic tank 2 constitute a case 1, and a part of the side wall of the electrolytic tank 2 constitutes an ion exchange membrane 8.

A material of the case 1 that constitutes the electrolytic tank 2 is not limited as long as the material has corrosion resistance with respect to the electrolytic solution, and examples thereof include polyvinyl chloride (PVA), polyvinyl alcohol (PVA), polyvinyl acetate, ABS, polyvinylidene chloride, polyacetal, polyethylene, polypropylene, polyisobutylene, a fluorine resin, an epoxy resin, and the like.

The case 1 may have a joint at the central portion of the cell 4. According to this, the case 1 can be manufactured by joining two members. In addition, when the members of the case 1 are processed before the joining, it is possible to easily process a portion that becomes an inner side of the electrolytic tank 2, and thus it is possible to reduce the manufacturing cost. For example, when the case 1 is manufactured with one member, it is necessary to hollow out the member. However, when using a plurality of the members, it is possible to easily manufacture the case 1 by easily cutting out a sheet-shaped material, or through injection molding. In addition, it is possible to easily provide the position adjustment section 19 or the attachment section 23.

In addition, in a case of constituting the case 1, which is included in one cell 4, with two members, it is possible to manufacture the case 1 by joining the two members having substantially the same shape with a bolt or an adhesive.

The electrolytic solution 3 is a liquid which is obtained by dissolving an electrolyte in a solvent and has ion conductivity. The kind of the electrolytic solution 3 is different depending on a kind of a metal that constitutes an electrode active material portion 6, but may be an electrolytic solution (electrolyte aqueous solution) using a water solvent, or an electrolytic solution (organic electrolytic solution) using an organic solvent.

For example, in a case of a zinc-air battery, an aluminum-air battery, and an iron-air battery, an aqueous alkaline solution such as an aqueous sodium hydroxide solution and an aqueous potassium hydroxide solution may be used as the electrolytic solution. In a case of a magnesium-air battery, an aqueous sodium chloride solution may be used as the electrolytic solution. In addition, in a case of a lithium metal battery, a sodium-air battery, and a calcium-air battery, an organic electrolytic solution may be used.

In addition, the electrolytic tank 2 may have a partition wall made of a solid electrolyte, the electrolyte aqueous solution may be stored in one side that is partitioned by the partition wall, and the organic electrolytic solution may be stored in the other side.

In addition, the metal-air battery 40 may include a mechanism that allows the electrolytic solution to flow. According to this, it is possible to promote a battery reaction in the metallic electrode 5 and the electrolytic solution 3, and thus it is possible to improve the performance of the metal-air battery 40. With regard to the mechanism that allows the electrolytic solution to flow, the electrolytic solution 3 may be circulated by using a pump 31 in a manner similar to the metal-air battery 40 illustrated in FIG. 1 so as to allow the electrolytic solution 3 in the electrolytic tank 2 to flow. In addition, the metal-air battery 40 may include a movable portion such as a stirrer, a wiper, and a vibrator which are capable of physically moving the electrolytic solution 3 in the electrolytic tank 2.

4. Metallic Electrode

The metallic electrode 5 is an electrode serving as an anode, and contains a metal that is an electrode active material. In addition, the metallic electrode 5 may be constituted by an electrode active material portion 6 that contains the electrode active material, and a conductive support member 7 that supports the electrode active material portion 6. In addition, the metallic electrode 5 may be constituted by only the electrode active material portion 6.

The electrode active material, which is contained in the electrode active material portion 6, is a metal which emits an electron due to a discharging reaction of a battery, and is chemically changed into a metallic compound precipitate 28 (a fine particle, a needle-like particle, a sheet-shaped particle, and the like).

For example, in a case of the zinc-air battery, the electrode active material portion 6 is made of metal zinc, and the metallic compound becomes a zinc oxide, or a zinc hydroxide. In a case of the aluminum-air battery, the electrode active material portion 6 is made of metal aluminum, and the metallic compound becomes an aluminum hydroxide. In a case of the iron-air battery, the electrode active material portion 6 is made of metal iron, and the metallic compound becomes an iron oxyhydroxide or an iron oxide. In a case of the magnesium-air battery, the electrode active material portion 6 is made of metal magnesium, and the metallic compound becomes a magnesium hydroxide.

In addition, in a case of the lithium-air battery, the sodium-air battery, and the calcium-air battery, the electrode active material portion 6 is made of each of metal lithium, metal sodium, and metal calcium, and the metallic compound becomes each of an oxide, a hydroxide, and the like of the metals.

In addition, the electrode active material and the metallic compound are not limited to the examples as long as a metal-air battery is obtained. In addition, in the above-described example, as the electrode active material that is contained in the electrode active material portion 6, metals constituted by one kind of metal element are exemplified, but the electrode active material portion 6 may be made of an alloy.

The chemical change from the electrode active material to the metallic compound precipitate 28 due to progress in the discharging reaction of a battery may occur in the electrode active material portion 6, or in both of the electrode active material portion 6 and the electrolytic solution 3. For example, in the electrode active material portion 6, a metal, which is an electrode active material, may react with an ion that is contained in the electrolytic solution 3, an ion that contains the metal may be generated in the electrolytic solution 3, and the ion that contains the metal may be decomposed to generate the metallic compound precipitate 28. In addition, in the electrode active material portion 6, the metal, which is the electrode active material, may react with the ion that is contained in the electrolytic solution 3 to generate the metallic compound precipitate 28. In addition, in the electrode active material portion 6, the metal, which is the electrode active material, may be dissolved in the electrolytic solution 3 as a metallic ion, and the metallic ion may be subjected to a reaction in the electrolytic solution so as to generate the metallic compound precipitate 28.

In addition, in a case of using two or more kinds of electrolytic solutions, in the electrode active material portion 6, the metal, which is the electrode active material, may be dissolved as a metal ion in a first electrolytic solution, and this metal ion may move into a second electrolytic solution to generate a metallic compound. In addition, the two or more kinds of electrolytic solutions may be partitioned by a solid electrolyte.

In addition, the metallic compound precipitate 28 is a used active material, and thus may be recovered by a used active material recovery mechanism.

The electrode active material portion 6 may be fixed onto a principal surface of the support member 7. The support member 7 has conductivity, and a shape thereof is not limited as long as the support member 7 is capable of fixing the electrode active material portion 6. Examples of the shape include a sheet shape, a tubular shape, a spherical shape, a linear shape, a mesh shape, a punching metal, and the like. In addition, for example, the support member 7 can be formed by a metal sheet having corrosion resistance with respect to the electrolytic solution. Examples of a material of the support member 7 include nickel, gold, silver, copper, stainless steel, and the like. In addition, the support member 7 may be a conductive substrate and the like which are subjected to a nickel plating treatment, a gold plating treatment, a silver plating treatment, or a copper plating treatment. Iron, nickel, stainless steel, and the like may be used for the conductive substrate.

According to this, a current can be collected from the electrode active material portion 6 through the support member 7, and the electrode active material portion 6 and an external circuit can be connected. The fixing of the electrode active material portion 6 onto the principal surface of the support member 7 may be performed as follows. For example, particles or a lump of the metal, which is the electrode active material, may be pressed and fixed to the surface of the support member 7, or a metal may be allowed to precipitate onto the support member 7 through a plating method and the like.

The support member 7 may be connected to a cover member 15 that plugs the electrode insertion opening 20 through which the metallic electrode 5 is inserted into the electrolytic tank 2. According to this, the electrode insertion opening 20 can be plugged in combination with the insertion of the metallic electrode 5 into the electrolytic tank 2, and thus it is possible to suppress a reaction of the electrolytic solution 3 with components in the air. For example, in a case of using an alkaline electrolytic solution as the electrolytic solution, it is possible to suppress neutralization of the alkaline electrolytic solution due to dissolution of carbon dioxide gas, which is contained in the air, into the electrolytic solution.

In addition, when the cover member 15 is provided, pulling-out of the metallic electrode 5 from the inside of the electrolytic tank 2, or insertion of the metallic electrode 5 into the electrolytic tank 2 becomes easy.

In addition, the cover member 15 may be provided with a terminal that connects the metallic electrode 5 and an external circuit. When this terminal is connected to the external circuit, it is possible to output electric power of the metal-air battery 40.

5. Electrode Insertion Opening, First Position Adjustment Section

The electrode insertion opening 20 is provided so as to insert the metallic electrode 5 into the electrolytic tank 2. According to this, it is possible to supply the electrode active material to the metal-air battery 40 in combination with the metallic electrode 5. In addition, it is possible to pull out the metallic electrode 5, in which the electrode active material is consumed due to a battery reaction, from the electrode insertion opening 20 so as to recover a used metallic electrode 5.

As described above, it is possible to supply the electrode active material to the metal-air battery 40 by exchanging of the metallic electrode 5 through the electrode insertion opening 20, and thus it is possible to allow the metal-air battery 40 to stably generate electricity.

In addition, in a case where the metal-air battery 40 includes a plurality of the cells 4, the metallic electrode 5 may be exchanged independently for each of the cells 4, or may be collectively exchanged with respect to the plurality of cells 4. In the case of collectively exchanging the metallic electrode 5 with respect to the plurality of cells 4, a plurality of the metallic electrodes 5 may be constituted in an assembly in which the plurality of metallic electrodes 5 are connected to each other. According to this, it is possible to exchange the metallic electrode 5 in a short period of time.

In addition, a metal-air battery after pulling out the metallic electrode 5 from the inside of the electrolytic tank 2 is referred to as a metal-air battery main body 42.

For example, the electrode insertion opening 20 may be provided in an upper portion of the electrolytic tank 2. According to this, it is possible to insert the metallic electrode 5 into the electrolytic tank 2 or to pull out a used metallic electrode 5 from the inside of the electrolytic tank 2 in a state where the electrolytic solution 3 is stored in the electrolytic tank 2, and thus it is possible to easily supply the electrode active material to the metal-air battery 40. According to this, it is possible allow the metal-air battery 40 to stably generate electricity.

A side wall of the electrode insertion opening 20 can be constituted by a position adjustment section 19a to be described later. According to this, it is possible to perform positioning of the metallic electrode 5 when the metallic electrode 5 passes through the electrode insertion opening 20. In addition, a shape of the narrowest portion of the electrode insertion opening 20 may be set to substantially the same shape as that of a cross-section of the metallic electrode 5 on a plane perpendicular to an insertion direction of the metallic electrode 5. In addition, the shape of the narrowest portion of the electrode insertion opening 20 may be set to a shape in which the metallic electrode 5 is substantially fitted into the electrode insertion opening 20 when the metallic electrode 5 passes through the electrode insertion opening 20. In addition, in a case where the metallic electrode 5 has a sheet shape, the thickness of the metallic electrode 5 and the width of the narrowest portion of the electrode insertion opening 20 may be substantially the same as each other. In addition, an appropriate gap may be formed between the metallic electrode 5 and the side wall of the electrode insertion opening 20 for passing through of the metallic electrode 5.

According to this configuration, during insertion of the metallic electrode 5 into the electrolytic tank 2, it is possible to determine a position at which the metallic electrode 5 is disposed in the electrolytic tank 2. According to this, it is possible to easily fix the metallic electrode 5 at a predetermined position in the electrolytic tank 2. In addition, the metallic electrode 5 may be fixed to a predetermined position in the electrolytic tank 2 by attaching the cover member 15, which is attached to the metallic electrode 5, to the metal-air battery main body 42, may be fixed by fitting a part of the metallic electrode 5 into the attachment section 23 provided in the electrolytic tank 2, or may be fixed by a combination of these fixing methods.

In a case where the metallic electrode 5 is disposed in the electrolytic tank 2, the electrode insertion opening 20 may be plugged by the cover member 15 and the like. According to this, it is possible to suppress leakage of the electrolytic solution 3, evaporation of a solvent of the electrolytic solution 3, dissolution of components, which are contained in the air, into the electrolytic solution, and the like.

In addition, in a state of the metal-air battery main body 42 after pulling-out of the metallic electrode 5, the electrode insertion opening 20 may enter an opened state. In addition, the metal-air battery main body 42 may be provided with an openable and closable cover configured to plug the electrode insertion opening 20. According to this, in the metal-air battery main body 42, it is possible to suppress leakage of the electrolytic solution and the like. In addition, a function of the cover may be provided to the position adjustment section 19a. For example, in a case where the position adjustment section 19a is made of a flexible material similar to the metal-air battery main body 42 illustrated in FIG. 12, in a state where the metallic electrode 5 is pulled out, it is possible to bring two position adjustment sections 19a, which are provided with the electrode insertion opening 20 inserted therebetween, into contact with each other. According to this, the position adjustment sections 19a can have the function of the cover of the metal-air battery main body 42.

The first position adjustment section 19a is provided to adjust a position of the metallic electrode 5 through contact between the metallic electrode 5 and the position adjustment section 19a during insertion of the metallic electrode 5 into the electrolytic tank 2. According to this, it is possible to perform positioning of the metallic electrode 5 at the position adjustment section 19a during insertion of the metallic electrode 5 into the electrolytic tank 2, and thus it is possible to smoothly and quickly insert the metallic electrode 5 into the electrolytic tank 2. According to this, it is possible to shorten the amount of time that is taken to supply the electrode active material to the metal-air battery 40, and thus it is possible to improve ease of use of the metal-air battery 40. In addition, it is possible to suppress damage of the metal-air battery 40 during insertion of the metallic electrode 5, and thus it is possible to prolong a lifespan of the metal-air battery 40.

For example, the position adjustment section 19a may be a portion that constitutes the side wall of the electrode insertion opening 20 in such a manner that the electrode insertion opening 20 becomes narrower as it goes toward the inside of the electrolytic tank 2, a portion having a roller 18 that is provided around the electrode insertion opening 20, or a portion that is made of an elastic material and is deformable toward the inside of the electrolytic tank.

First, description will be given of the case where the position adjustment section 19a is the portion that constitutes the side wall of the electrode insertion opening 20 in such a manner that the electrode insertion opening 20 becomes narrower as it goes toward the inside of the electrolytic tank 2.

The position adjustment section 19a constitutes the side wall around the electrode insertion opening 20, and the side wall has a shape with which the electrode insertion opening 20 becomes narrower as it goes toward the inside of the electrolytic tank 2. For example, the position adjustment section 19a may have the same shape as that of the position adjustment section 19a that is included in the metal-air battery 40 illustrated in FIG. 1. In the metal-air battery 40 illustrated in FIGS. 1 to 3, the electrode active material portion 6 is provided on both surfaces of the sheet-shaped support member 7, respectively. In addition, the thickness of the metallic electrode 5 at a portion, at which the electrode active material portion 6 is provided, is substantially the same as the width of the narrowest portion of the electrode insertion opening 20.

Figure 4:
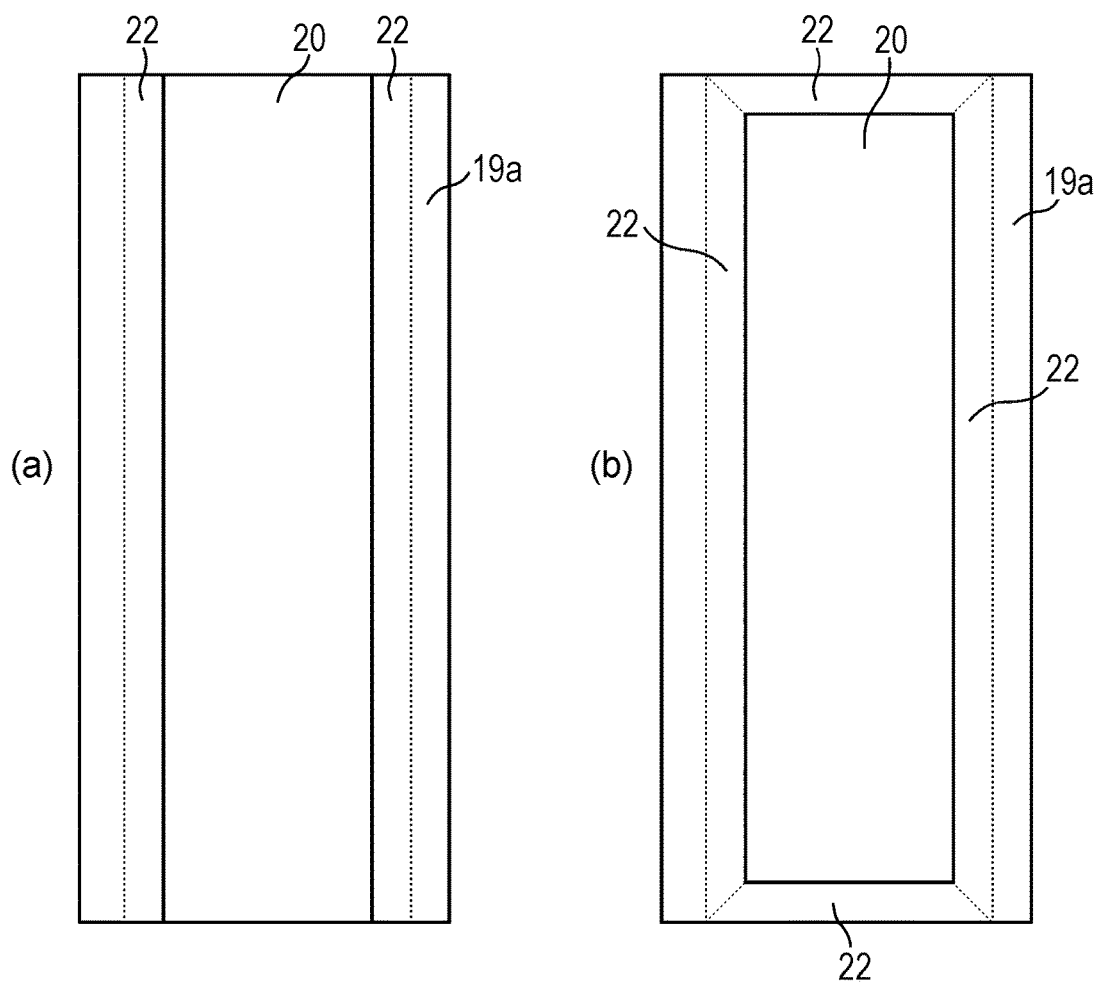
FIGS. 4 (a) and (b) of FIG. 4 are schematic top views of a position adjustment section and an electrode insertion opening which are included in the metal-air battery of the embodiment of the invention.

(a) of FIG. 4 is a top view of the position adjustment section 19a and the electrode insertion opening 20 which are included in the metal-air battery 40 illustrated in FIG. 1. As illustrated in (a) of FIG. 4, the electrode insertion opening 20 has a rectangular shape, and two facing side walls on long sides are constituted by the position adjustment section 19a. In addition, with regard to the position adjustment section 19a, as illustrated in (b) of FIG. 4, two facing side walls on short sides may be constituted by the position adjustment section 19a. In addition, FIG. 4 is a top view of the position adjustment section 19a and the electrode insertion opening 20 in the metal-air battery main body 42 in a state where the metallic electrode 5 is pulled out from the electrolytic tank 2.

In the position adjustment section 19a illustrated in FIG. 1 and (a) of FIG. 4, the position adjustment section 19a has two inclined side walls 22, and the two side walls 22 are provided in such a manner that the width of the electrode insertion opening 20 becomes narrower as it goes toward the inside of the electrolytic tank 2. In addition, a lower portion of each of the side walls of the position adjustment section 19a becomes a side wall of the electrode insertion opening 20 at a portion having the narrowest width.

Figure 5:
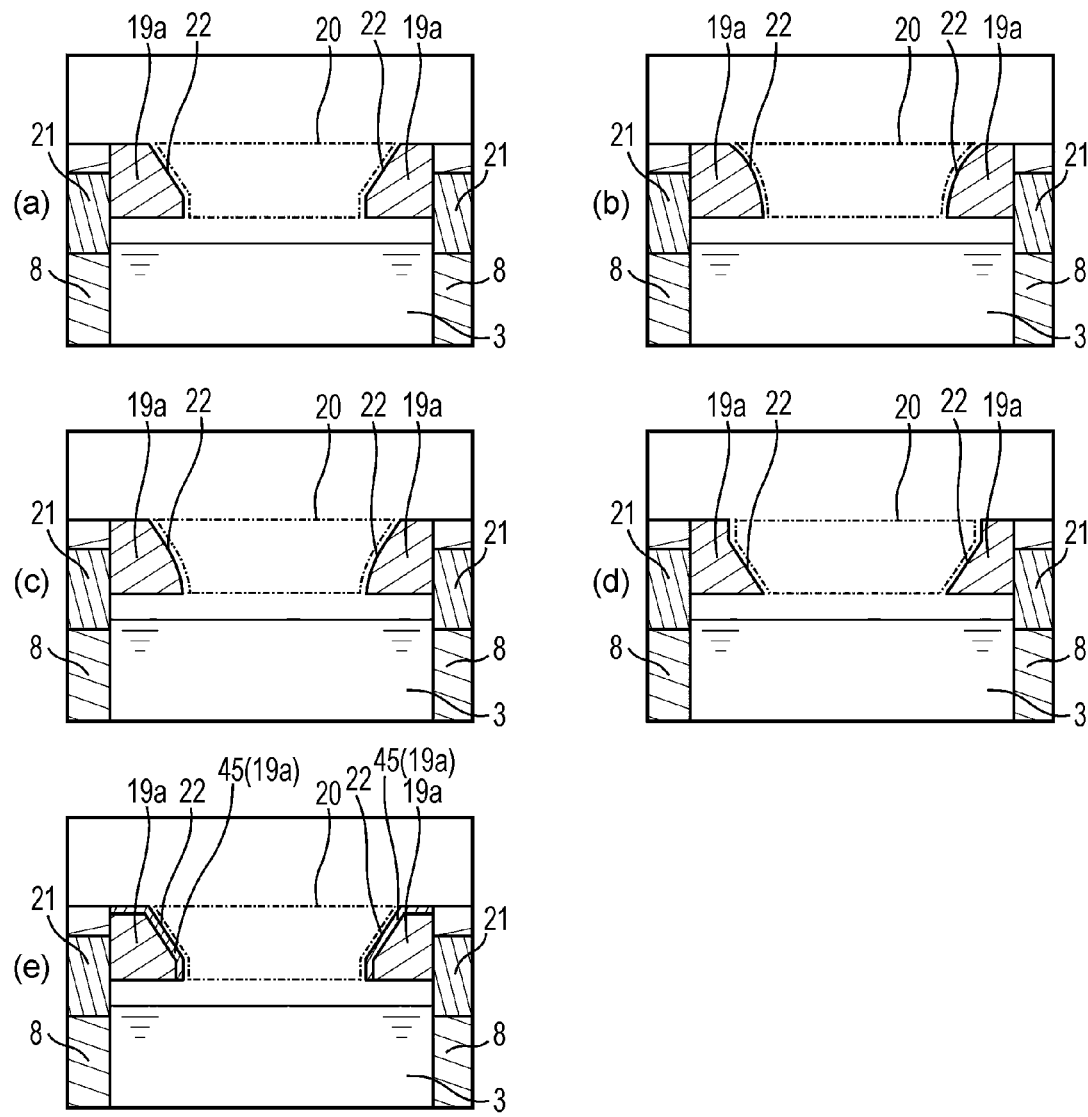
FIG. 5 (a) to (e) of FIG. 5 are schematic cross-sectional views of a part of the metal-air battery of the embodiment of the invention.

(a) to (e) of FIG. 5 are views illustrating various aspects of the shape and the like of the position adjustment section 19a. In addition, (a) to (e) of FIG. 5 are cross-sectional views of the position adjustment section 19a, the electrode insertion opening 20, and the like in the metal-air battery main body 42 in a state where the metallic electrode 5 is pulled out from the electrolytic tank 2. (a) of FIG. 5 illustrates the position adjustment section 19a that includes the side wall 22 having a constant inclination angle similar to the position adjustment section 19a illustrated in FIG. 1, (b) of FIG. 5 illustrates the position adjustment section 19a in which the inclination angle of the side wall 22 increases as it goes toward the inside of the electrolytic tank 2, (c) of FIG. 5 illustrates the position adjustment section 19a in which the side wall 22 has a constant inclination angle at an upper portion, and the inclination angle increases at a lower portion as it goes toward the inside of the electrolytic tank 2, and (d) of FIG. 5 illustrates the position adjustment section 19a in which the side wall 22 having a constant inclination angle is provided on a lower portion of the position adjustment section 19a. As described above, the position adjustment section 19a may have various shapes.

In addition, (e) of FIG. 5 illustrates the position adjustment section 19a that includes a buffering member 45 on a surface that constitutes the side wall 22. When the buffering member 45 is provided, it is possible to suppress damage of the metallic electrode 5 or the metal-air battery main body 42 during insertion of the metallic electrode 5 into the electrolytic tank 2.

As a material of the buffering member 45, a flexible material in a rubber shape or a sponge shape, which has corrosion resistance with respect to the electrolytic solution, is preferable, and specific examples thereof include polyolefin, polyvinyl chloride, polyvinyl alcohol, silicone, polyethylene, polyvinyl acetate, ethylene propylene, a fluorine-based resin, a melamine resin, and the like.

In addition, the position adjustment section 19a may be made of a material that has flexibility, elasticity, and the like. According to this, it is possible to suppress damage of the metallic electrode 5 or the metal-air battery main body 42 during insertion of the metallic electrode 5 into the electrolytic tank 2.

As the material having the flexibility, the elasticity, and the like, a flexible material in a rubber shape or a sponge shape, which has corrosion resistance with respect to the electrolytic solution, is preferable, and specific examples thereof include polyolefin, polyvinyl chloride, polyvinyl alcohol, silicone, polyethylene, polyvinyl acetate, ethylene propylene, a fluorine-based resin, a melamine resin, and the like.

Figure 6:
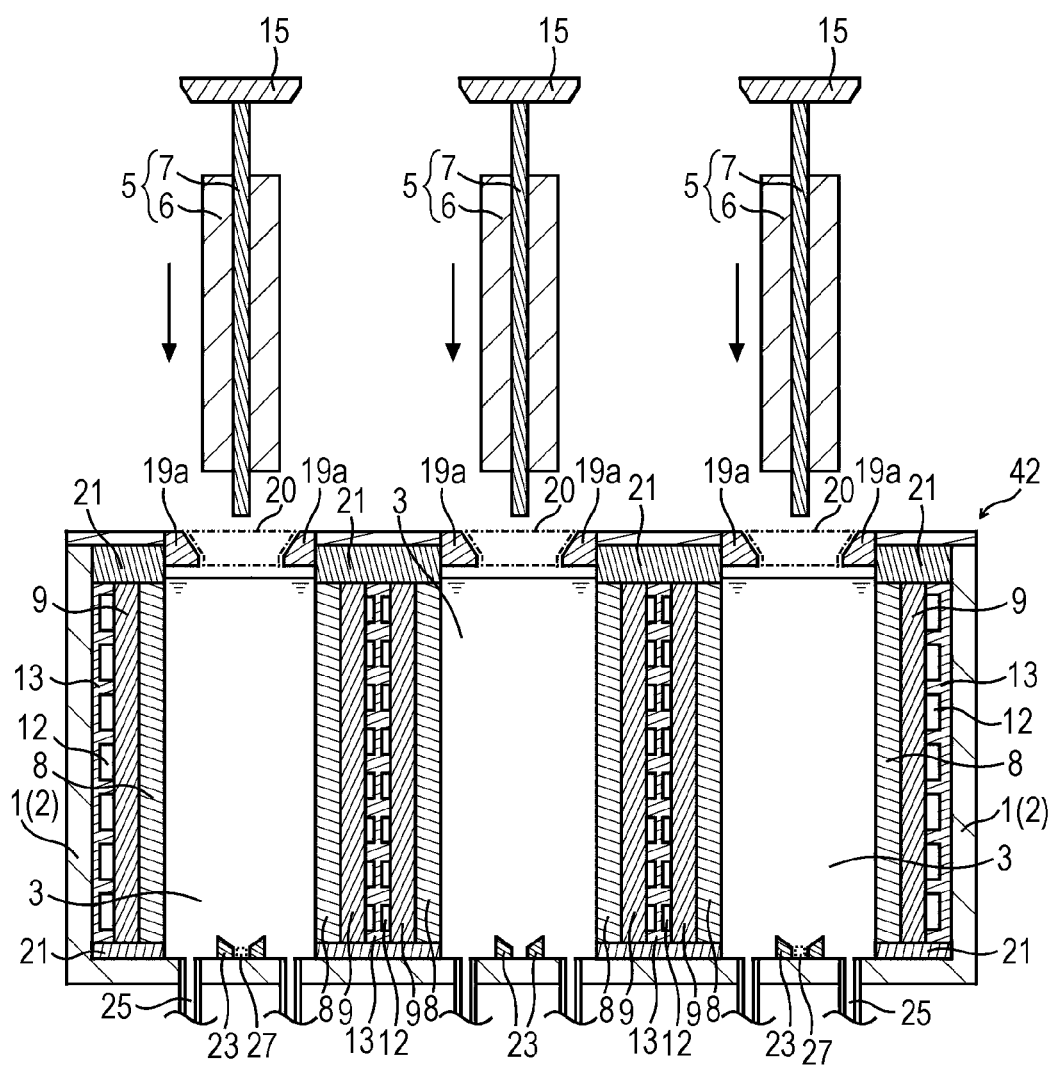
FIG. 6 is a schematic cross-sectional view of the metal-air battery of the embodiment of the invention during insertion of a metallic electrode into a metal-air battery main body.
Figure 7:
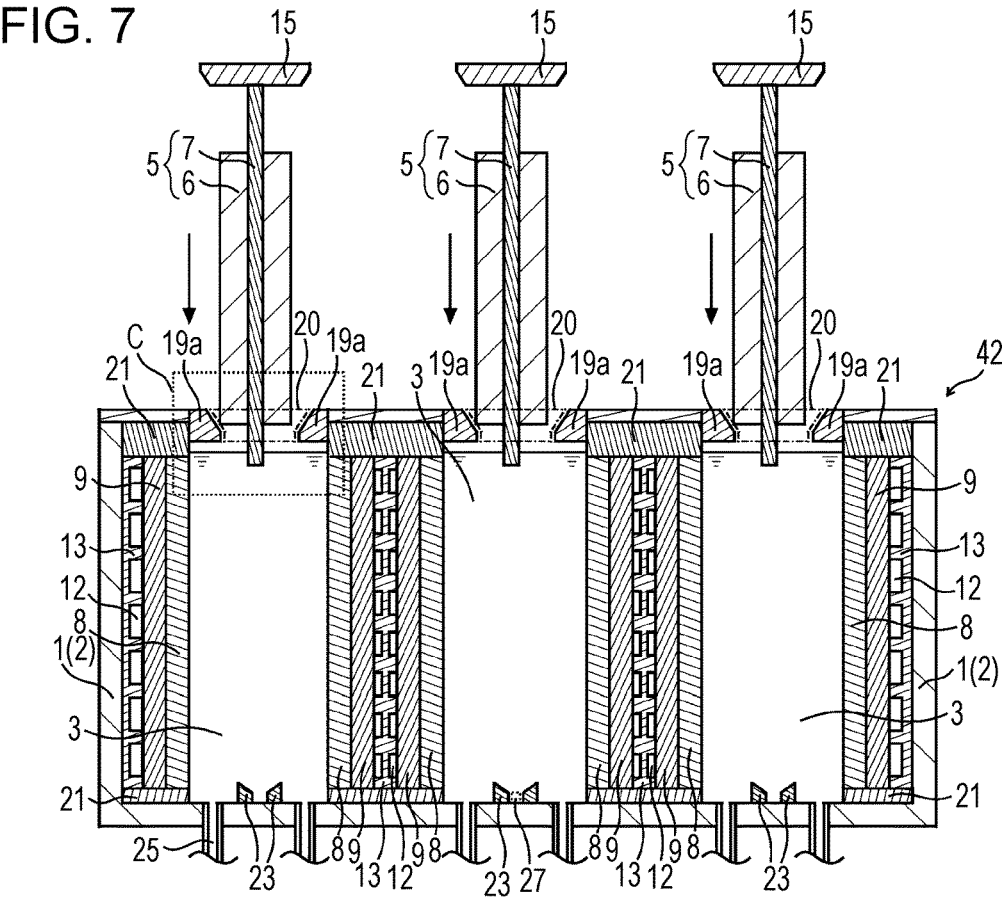
FIG. 7 is a schematic cross-sectional view of the metal-air battery of the embodiment of the invention during insertion of the metallic electrode into the metal-air battery main body.

FIGS. 6 and 7 are schematic cross-sectional views of the metal-air battery 40 during insertion of a new metallic electrode 5 into the electrolytic tank 2 of the metal-air battery main body 42, from which a used metallic electrode 5 is pulled out, in the metal-air battery 40 illustrated in FIGS. 1 to 3. In addition, FIG. 8 is an enlarged view of a range C that is surrounded by a dotted line of FIG. 7.

As illustrated in FIG. 6, before insertion of the new metallic electrode 5 into the electrode insertion opening 20, positioning of the metallic electrode 5 is performed to be located on an upper side (in a range indicated by D in FIG. 8) of the widest portion of the electrode insertion opening 20.

Figure 8:
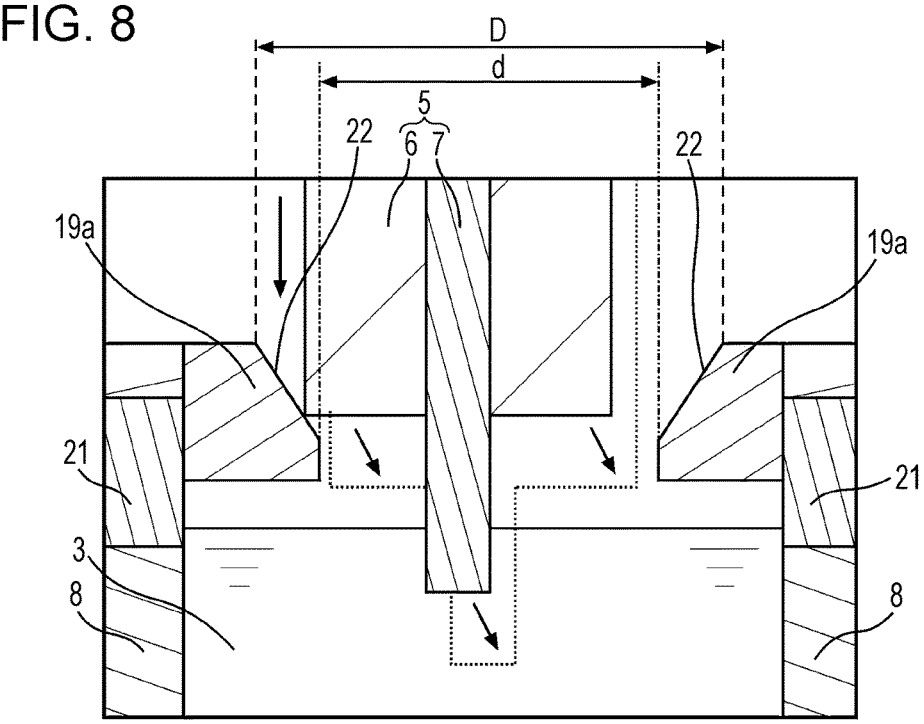
FIG. 8 is a schematic cross-sectional view of the metal-air battery in a range C surrounded by a dotted line of FIG. 7.

In addition, as illustrated in FIGS. 7 and 8, as the metallic electrode 5 is inserted into the electrode insertion opening 20, the metallic electrode 5 may come into contact with the position adjustment section 19a that constitutes the side wall 22 of the electrode insertion opening 20. The side wall 22 has a shape in which the electrode insertion opening 20 becomes narrower as it goes toward the inside of the electrolytic tank 2, and thus the metallic electrode 5, which comes into contact with the position adjustment section 19a, slides on the side wall 22 and moves to the central portion of the electrode insertion opening 20. In addition, the metallic electrode 5 passes through the narrowest portion (a range indicated by d in FIG. 8) of the electrode insertion opening 20, and is inserted into the electrolytic tank 2.

As described above, when passing through the electrode insertion opening 20, the position of the metallic electrode 5 is adjusted by the position adjustment section 19a.

Since the metal-air battery 40 includes the position adjustment section 19a as described above, when positioning of the metallic electrode 5 on the upper side of the widest portion of the electrode insertion opening 20 is performed before insertion of the metallic electrode 5 into the electrolytic tank 2, it is possible to insert the metallic electrode 5 into the electrolytic tank 2. Accordingly, it is not necessary to perform position adjustment with high accuracy before insertion of the metallic electrode 5 into the electrolytic tank 2, it is possible to shorten time that is taken to perform positioning of the metallic electrode 5, and it is possible to smoothly insert the metallic electrode 5 into the electrolytic tank 2.

In addition, the metallic electrode 5, which comes into contact with the position adjustment section 19a, slides on the side wall 22 while coming into contact therewith to the central portion of the electrode insertion opening 20, and is inserted into the electrolytic tank 2. Accordingly, the insertion is not stopped due to the contact. As a result, even when the metallic electrode 5 and the position adjustment section 19a come into contact with each other, an impact is further mitigated in comparison to a metal-air battery of the related art in which insertion is difficult due to collision between the metallic electrode and the metal-air battery main body which is caused by a deviation in the positioning, and thus it is possible to insert the metallic electrode 5 into the electrolytic tank 2 without damage of the metallic electrode 5 or the metal-air battery main body 42.

Next, description will be given of a case where the position adjustment section 19a includes the roller 18 that is provided around the electrode insertion opening 20.

The position adjustment section 19a includes the roller 18 that is provided around the electrode insertion opening 20. In addition, the roller 18 is provided to rotate during insertion of the metallic electrode 5 into the electrolytic tank 2.

Figure 9:
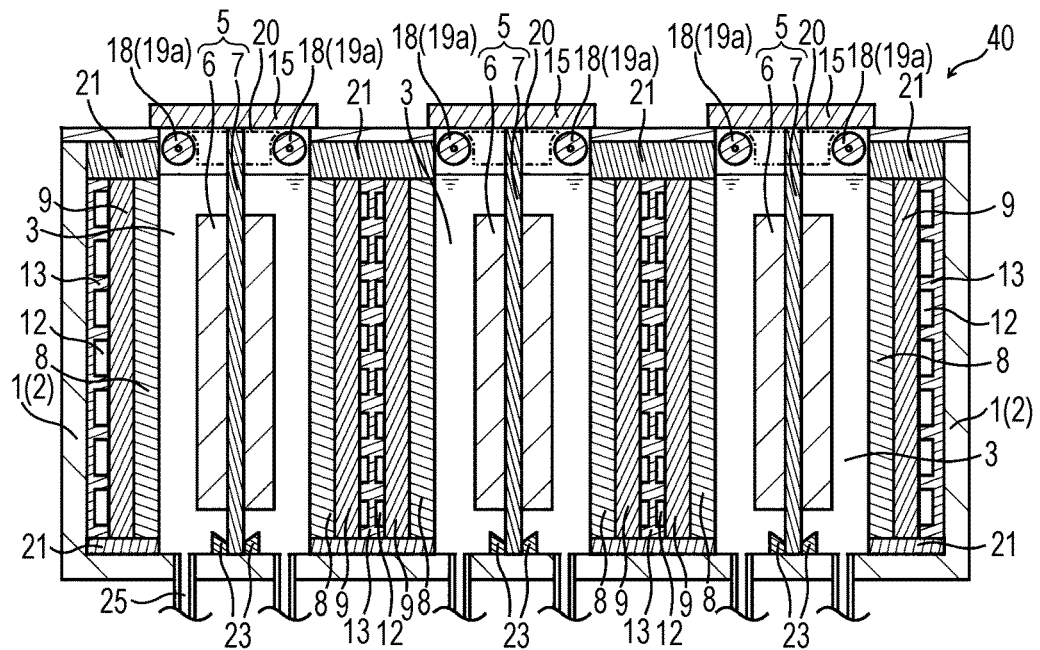
FIG. 9 is a schematic cross-sectional view of the metal-air battery of the embodiment of the invention.

For example, the position adjustment section 19a may be provided in such a manner that two rollers 18 constitute both side walls of the electrode insertion opening 20 similar to a position adjustment section 19a that is included in a metal-air battery 40 illustrated in FIG. 9. In the metal-air battery 40 illustrated in FIG. 9, the electrode active material portion 6 is provided on both surfaces of the sheet-shaped support member 7, respectively. In addition, the thickness of the metallic electrode 5 at a portion, at which the electrode active material portion 6 is provided, is substantially the same as the width of the narrowest portion of the electrode insertion opening 20 between the two rollers 18.

Figure 10:
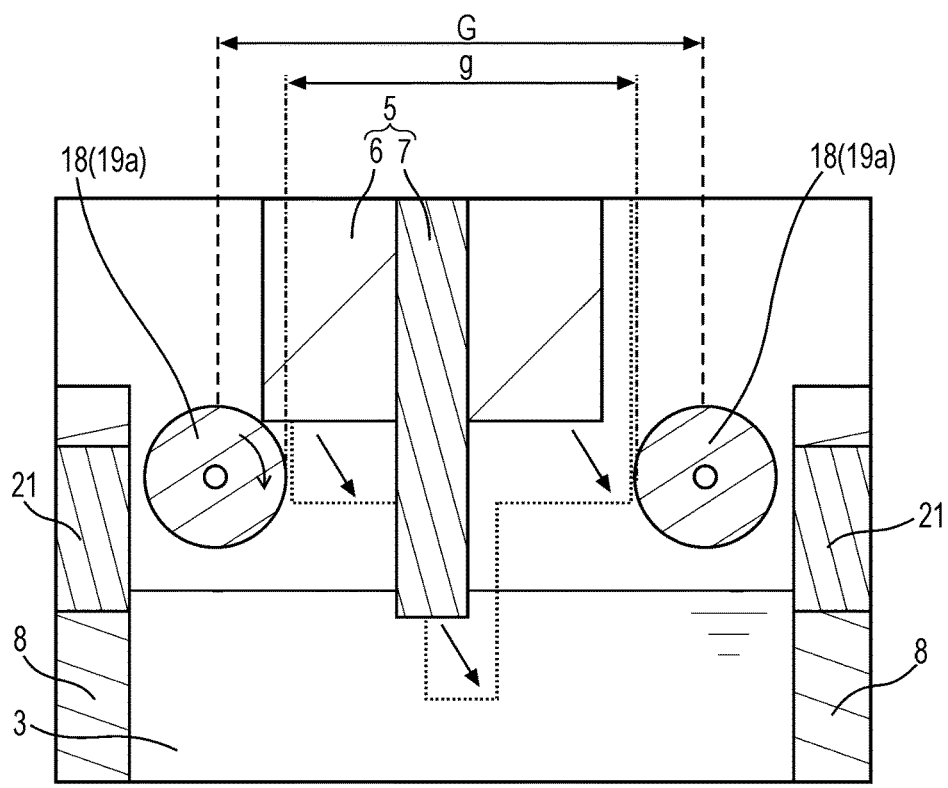
FIG. 10 is a schematic cross-sectional view of a part of the metal-air battery of the embodiment of the invention during insertion of the metallic electrode into the metal-air battery main body.

FIG. 10 is a partial schematic cross-sectional view of the metal-air battery 40 during insertion of a new metallic electrode 5 into the electrolytic tank 2 of the metal-air battery main body 42, from which a used metallic electrode 5 is pulled out, in the metal-air battery 40 illustrated in FIG. 9.

First, before insertion of the new metallic electrode 5 into the electrode insertion opening 20, positioning of the metallic electrode 5 is performed to be located on an upper side (in a range indicated by G in FIG. 10) of the widest portion of the electrode insertion opening 20.

In addition, as illustrated in FIG. 10, as the metallic electrode 5 is inserted into the electrode insertion opening 20, the metallic electrode 5 may come into contact with one of the rollers 18 (position adjustment sections 19a) that constitutes the side wall 22 of the electrode insertion opening 20. When the metallic electrode 5 comes into contact with the roller 18, the roller 18 rotates in such a manner that a surface on an electrode insertion opening 20 side moves downwardly. The metallic electrode 5, which comes into contact with the roller 18, moves to the central portion of the electrode insertion opening 20 due to rotation of the roller 18. In addition, the metallic electrode 5 passes through a space (a range g indicated by g in FIG. 10) between the two rollers 18, and is inserted into the electrolytic tank 2.

As described above, when passing through the electrode insertion opening 20, the position of the metallic electrode 5 is adjusted by the rollers 18 (position adjustment sections 19a). The metallic electrode 5, which comes into contact with the roller 18, moves to the central portion while coming into contact with the roller 18, and is inserted into the electrolytic tank 2. Accordingly, even when the metallic electrode 5 and the roller 18 (position adjustment section 19a) come into contact with each other, an impact is further mitigated in comparison to a metal-air battery of the related art in which insertion is difficult due to collision between the metallic electrode and the metal-air battery main body which is caused by a deviation in the positioning, and thus it is possible to insert the metallic electrode 5 into the electrolytic tank 2 without damage of the metallic electrode 5.

Next, description will be given of a case where the position adjustment section 19a is made of an elastic material, and is a portion capable of being deformed toward the inside of the electrolytic tank 2.

The position adjustment section 19a is made of an elastic material, and when the metallic electrode 5 comes into contact with the position adjustment section 19a during insertion of the metallic electrode 5 into the electrolytic tank 2, the position adjustment section 19a can be deformed toward the inside of the electrolytic tank 2. For example, similar to a position adjustment section 19a that is included in the metal-air battery 40 illustrated in FIG. 11, two position adjustment sections 19a, which are provided on both sides of the metallic electrode 5, are deformed toward the inside of the electrolytic tank 2, and come into contact with the metallic electrode 5. In addition, in the metal-air battery 40 illustrated in FIG. 11, the electrode active material portion is provided on both surfaces of the sheet-shaped support member 7, respectively.

As the elastic material, a material having corrosion resistance with respect to the electrolytic solution is preferable, and specific examples thereof include polyolefin, polyvinyl chloride, polyvinyl alcohol, silicone, polyethylene, polyvinyl acetate, ethylene propylene, a fluorine-based resin, a melamine resin, and the like.

Figure 11:
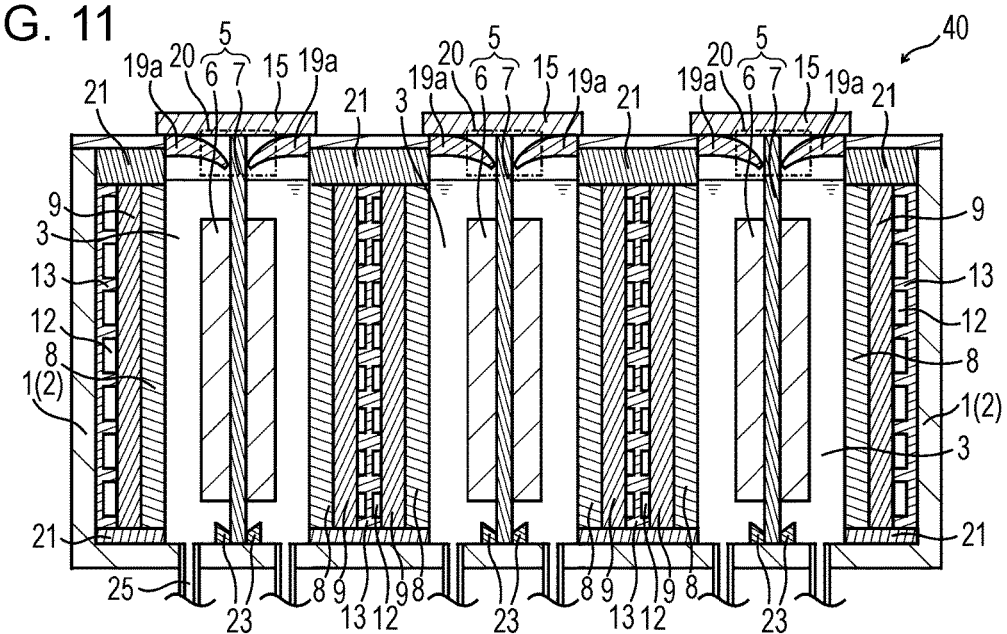
FIG. 11 is a schematic cross-sectional view of the metal-air battery of the embodiment of the invention.
Figure 12:
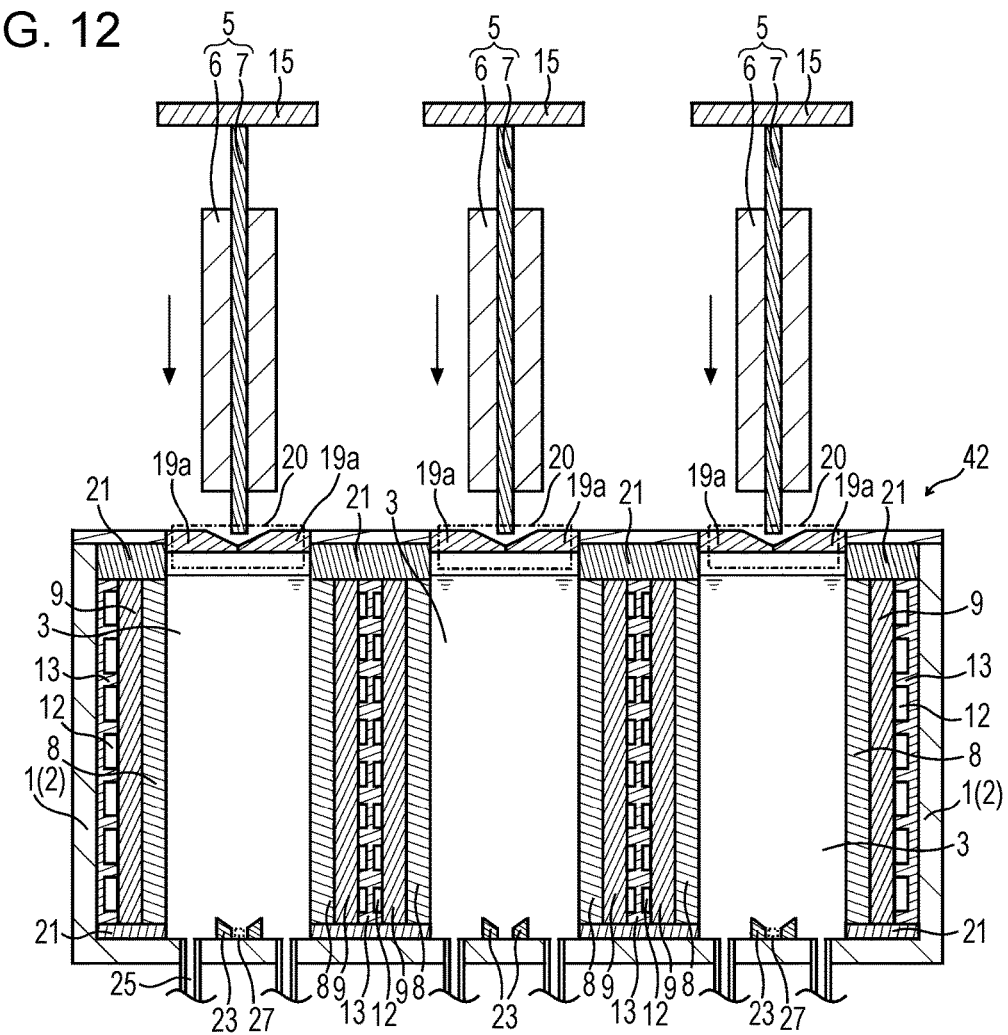
FIG. 12 is a schematic cross-sectional view of the metal-air battery of the embodiment of the invention during insertion of the metallic electrode into the metal-air battery main body.

FIG. 12 is a schematic cross-sectional view of the metal-air battery main body 42 from which the metallic electrode 5 is pulled out from the electrolytic tank 2, and a new metallic electrode 5 to be inserted into the electrolytic tank 2 in the metal-air battery illustrated in FIG. 11. In addition, in the metal-air battery main body 42, the two position adjustment sections 19a comes into contact with each other, and thus the electrode insertion opening 20 is plugged. According to this, it is possible to suppress leakage of the electrolytic solution from the metal-air battery main body 42 due to flowing of the electrolytic solution 3, and the like. In addition, when pulling out a used metallic electrode 5 from the metal-air battery main body 42, it is possible to wipe off the electrolytic solution 3, which adheres to the metallic electrode 5, by the position adjustment section 19a to return the electrolytic solution 3 to the inside of the electrolytic tank 2, and thus it is possible to increase stability of the metal-air battery 40.

Figure 13:
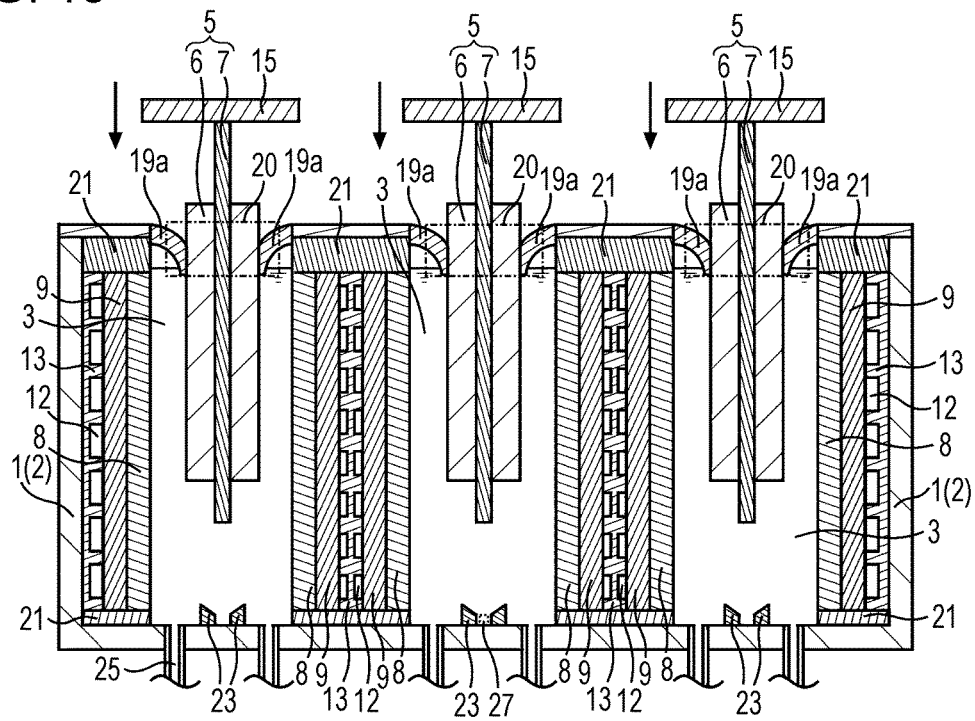
FIG. 13 is a schematic cross-sectional view of the metal-air battery of the embodiment of the invention during insertion of the metallic electrode into the metal-air battery main body.

FIG. 13 is a schematic cross-sectional view of the metal-air battery 40 when the electrode active material portion 6, which is included in a new metallic electrode 5 to be inserted into the electrolytic tank 2, passes through the electrode insertion opening 20 in the metal-air battery illustrated in FIG. 11. In addition, at this time, the two position adjustment sections 19a which are made of an elastic material are deformed toward the inside of the electrolytic tank 2 due to contact with the metallic electrode 5, and the metallic electrode 5 passes through a space between the two position adjustment sections 19a.

Figure 14:
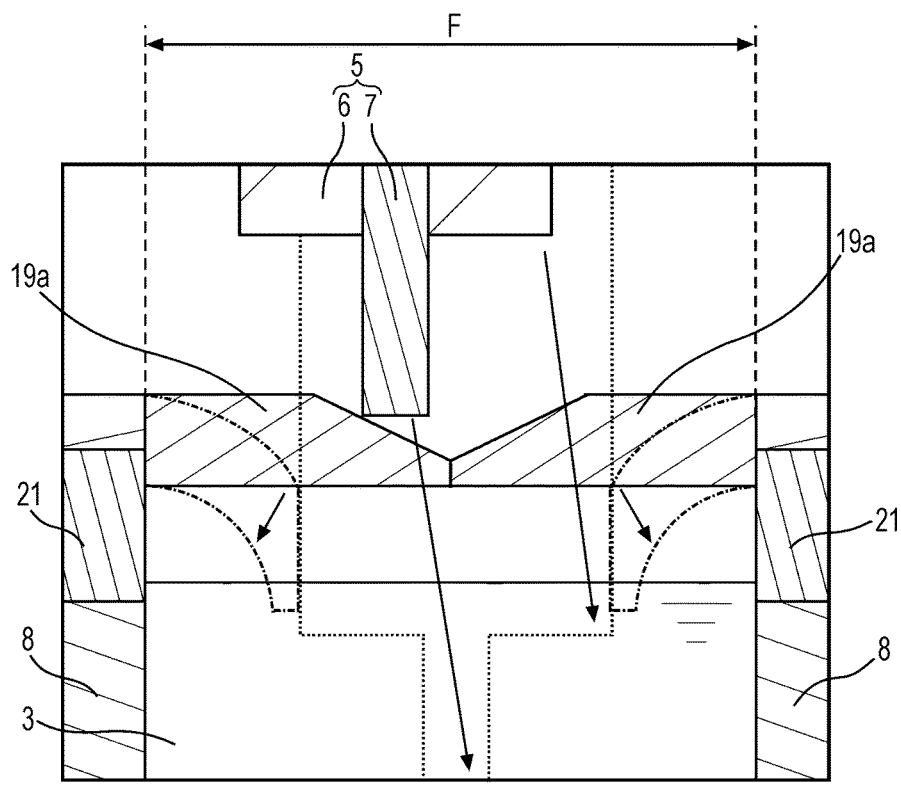
FIG. 14 is a schematic cross-sectional view of a part of the metal-air battery of the embodiment of the invention during insertion of the metallic electrode into the metal-air battery main body.

In addition, FIG. 14 is a view illustrating a situation in which the position of the metallic electrode 5 is adjusted by the position adjustment sections 19a.

As illustrated in FIG. 12, before insertion of the new metallic electrode 5 into the electrode insertion opening 20, positioning of the metallic electrode 5 is performed to be located on an upper side (in a range indicated by F in FIG. 14) of the position adjustment section 19a made of an elastic material.

In addition, as illustrated in FIG. 14, when the metallic electrode 5 is brought into contact with the position adjustment sections 19a, the position adjustment sections 19a are deformed toward the inside of the electrolytic tank 2. When the position adjustment sections 19a are deformed, the electrode insertion opening 20, which is plugged by the position adjustment section 19a, is opened. In addition, the surface of the position adjustment sections 19a, which come into contact with the metallic electrode 5, is inclined, and thus when the position adjustment sections 19a are deformed, the metallic electrode 5 slides on the surface of the position adjustment sections 19a, and moves in a direction of the electrode insertion opening 20 that is opened.

As the metallic electrode 5 is inserted into the electrode insertion opening 20, the electrode insertion opening 20 between the two position adjustment sections 19a are pushed by the metallic electrode 5 and are opened, and the metallic electrode 5 passes through the electrode insertion opening 20 that is pushed and opened, and is inserted into the electrolytic tank 2.

As described above, when passing through electrode insertion opening 20, the position of the metallic electrode 5 is adjusted by the position adjustment sections 19a.

6. Attachment Section, Second Position Adjustment Section

The attachment section 23 is a portion which is provided in the electrolytic tank 2, and into which a part of the metallic electrode 5 is fitted. When a part of the metallic electrode 5 is fitted into the attachment section 23, it is possible to fix the metallic electrode 5 at a predetermined position in the electrolytic tank 2. According to this, it is possible to suppress damage of the metal-air battery 40 due to vibration. In addition, it is possible to suppress a variation in a gap between the metallic electrode 5 and the air electrode 9, and thus it is possible to stabilize the performance of the metal-air battery 40. In addition, it is possible to suppress deformation of the metallic electrode 5.

The attachment section 23 may be provided in order the electrode active material portion 6 to be fitted thereinto, in order for the support member 7 to be fitted thereinto, or in order for both of the electrode active material portion 6 and the support member 7 to be fitted thereinto, but it is preferable that the attachment section 23 is provided in order for the support member 7 to be fitted thereinto. The reason for the preference is that when the electrode active material is consumed due to an electrode reaction, the shape of the electrode active material portion 6 varies.

In addition, the attachment section 23 may have a receiving opening 27 into which a part of the metallic electrode 5 is fitted, or the metallic electrode 5 may have a receiving opening and the attachment section 23 may have a protrusion which is fitted into the receiving opening. The shape of the receiving opening 27 may be a hole shape, a groove shape, or a slit shape.

The attachment section 23 may be provided on the bottom of the electrolytic tank 2, or on a side wall of the electrolytic tank 2. In addition, the attachment section 23 may be provided on both of the bottom and the side wall.

For example, the attachment section 23, which is included in the metal-air battery 40 which is illustrated in FIGS. 1, 6, 7, 9, 11 to 13, 15, and 16, is provided on the bottom of the electrolytic tank 2, and one set of the attachment sections 23 are provided with the receiving opening 27 interposed therebetween. In addition, the receiving opening 27 has a hole shape or a groove shape.

In addition, the attachment section 23, which is included in the metal-air battery 40 illustrated in FIGS. 2 and 3, the attachment section 23 is provided on a side wall of the electrolytic tank 2, and one set of the attachment sections 23 are provided with the receiving opening 27 interposed therebetween. In addition, the receiving opening 27 has a groove shape.

Figure 17:
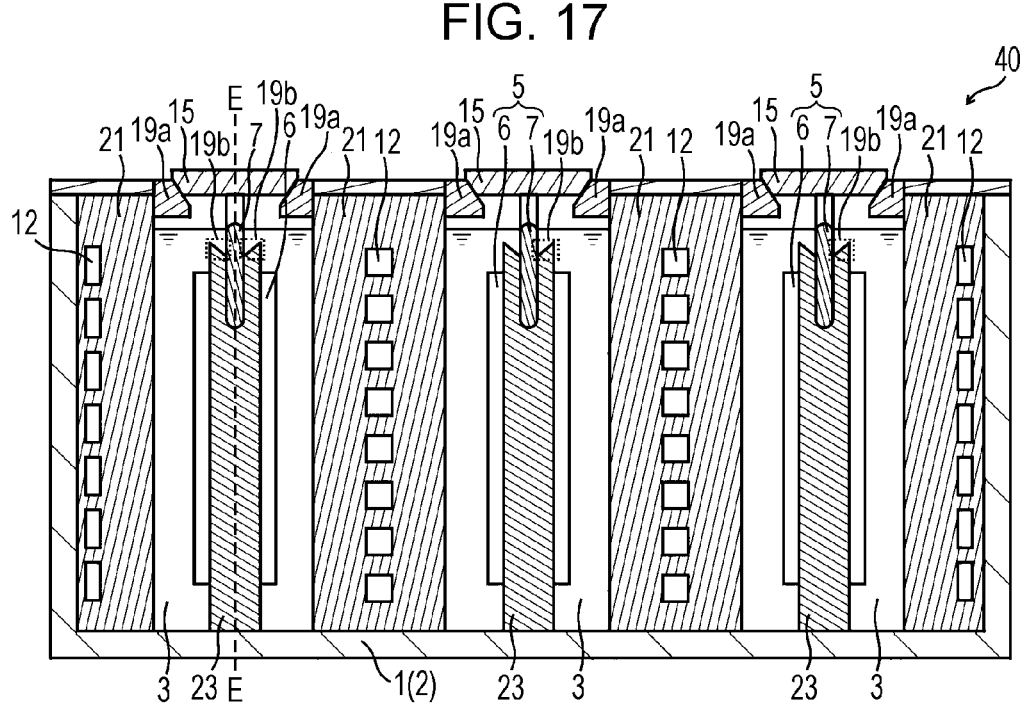
FIG. 17 is a schematic cross-sectional view of the metal-air battery of the embodiment of the invention.
Figure 18:
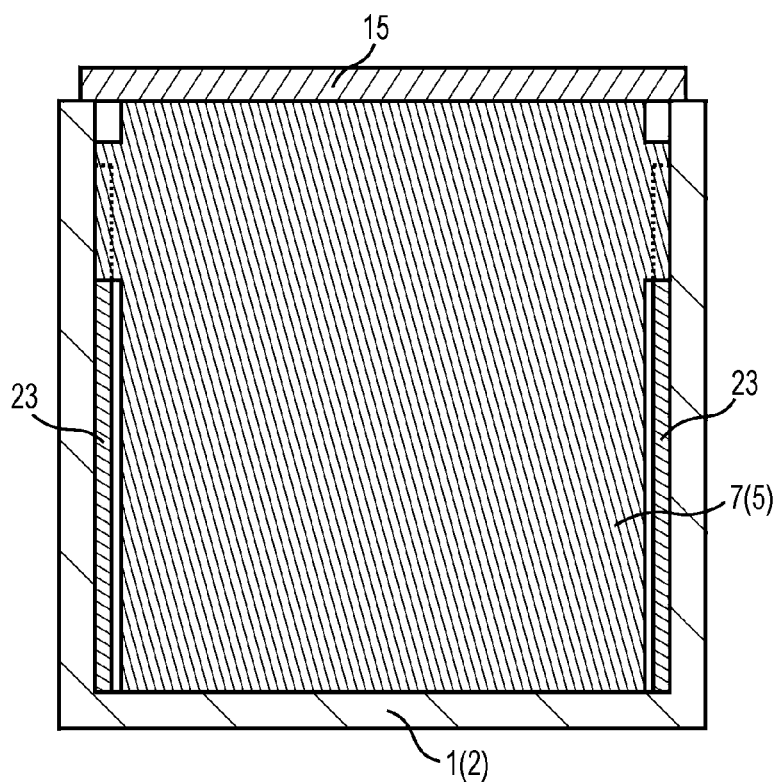
FIG. 18 is a schematic cross-sectional view of the metal-air battery which is taken along broken line E-E of FIG. 17.

In addition, the attachment section 23, which is included in the metal-air battery 40 illustrated in FIGS. 17 and 18, is provided on the side wall of the electrolytic tank 2, and a slit serving as the receiving opening 27 is provided. In addition, FIG. 17 corresponds to a cross-sectional view of the metal-air battery 40 which is taken along dotted line B-B in FIG. 2.

In addition, FIG. 18 is a schematic cross-sectional view of the metal-air battery 40 which is taken along dotted line E-E in FIG. 17. In the metal-air battery 40 illustrated in FIGS. 17 and 18, an ear portion is provided to the support member 7 of the metallic electrode 5, and the ear portion is fitted into the slit-shaped receiving opening 27 that is provided to the attachment section 23.

Figure 19:
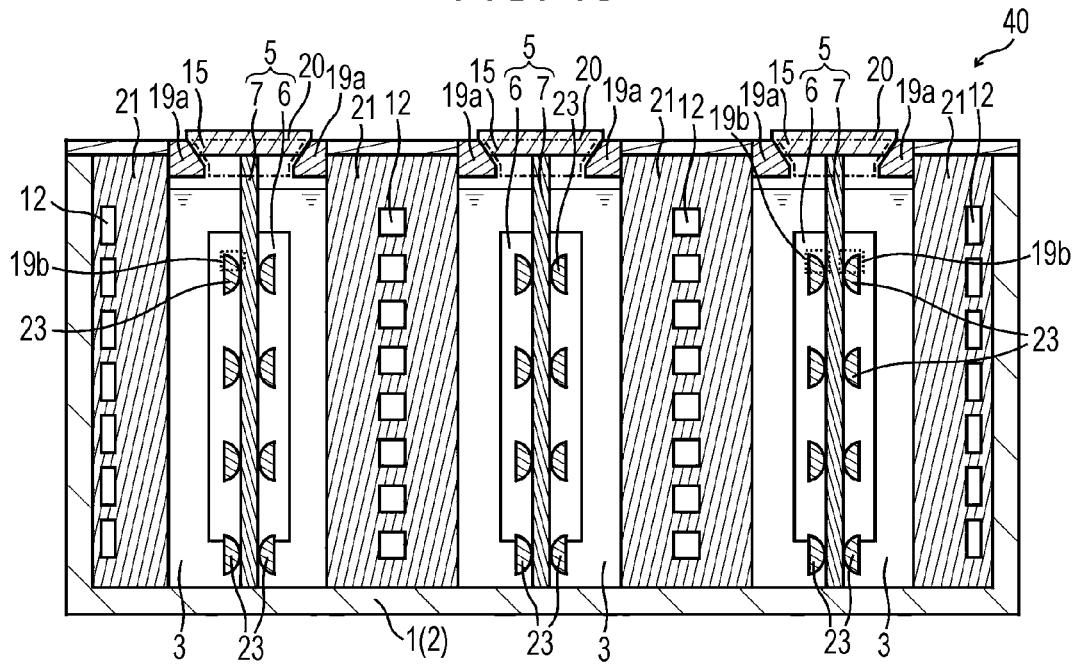
FIG. 19 is a schematic cross-sectional view of the metal-air battery of the embodiment of the invention.

In addition, the attachment section 23, which is included in the metal-air battery 40 illustrated in FIG. 19, are provided on the side wall of the electrolytic tank 2, and one set of semi-circular attachment sections 23 are provided with the receiving opening 27 interposed therebetween. In addition, the receiving opening 27 has a groove shape. In addition, FIG. 19 corresponds to a cross-sectional view of the metal-air battery 40 which is taken along dotted line B-B in FIG. 2.

Figure 20:
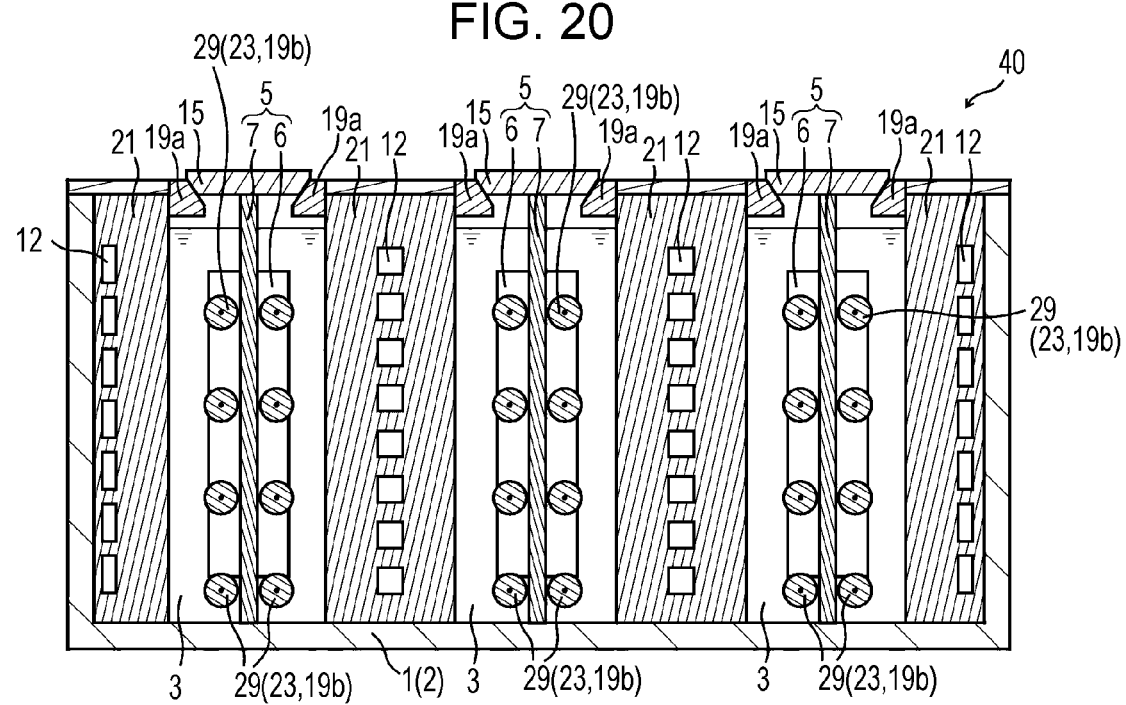
FIG. 20 is a schematic cross-sectional view of the metal-air battery of the embodiment of the invention.

In addition, the attachment section 23, which is included in the metal-air battery 40 illustrated in FIG. 20, is provided on the side wall of the electrolytic tank 2, and one set of rollers 29 are provided with the receiving opening 27 interposed therebetween. The receiving opening 27 has a groove shape. In addition, FIG. 20 corresponds to the cross-sectional view of the metal-air battery 40 which is taken along dotted line B-B in FIG. 2.

The attachment section 23 can be made of a conductive material such as a metal. According to this, it is possible to electrically connect the metallic electrode 5 and the attachment section 23. In addition, the attachment section 23 can be electrically connected to an external circuit, the air electrode 9 of the cell 4 that is adjacent thereto or the attachment section 23 of the adjacent cell 4. According to this, a plurality of the cells 4 are connected in series or in parallel through the attachment section 23, and thus it is possible to output an electromotive force to the external circuit. In addition, a connection terminal and the attachment section 23 can be made common, and thus it is possible to reduce the manufacturing cost.

In addition, the attachment section 23 can have corrosion resistance with respect to the electrolytic solution 3 that is stored in the electrolytic tank 2. According to this, it is possible to stably fix the metallic electrode 5 by the attachment section 23.

A second position adjustment section 19b may be provided to the attachment section 23. In addition, in a case where the receiving opening is provided to the metallic electrode 5, the position adjustment section 19b may be provided to the metallic electrode 5. The position adjustment section 19b is provided in such a manner that when the metallic electrode 5 is inserted into the electrolytic tank 2 and the metallic electrode 5 is attached to the attachment section 23, the metallic electrode 5 and the position adjustment section 19b come into contact with each other, thereby adjusting the position of the metallic electrode 5. According to this, when the metallic electrode 5 is attached to the attachment section 23, positioning of the metallic electrode 5 can be performed at the position adjustment section 19b, and thus it is possible to smoothly attach the metallic electrode 5 to the attachment section 23. As a result, it is possible to shorten time taken to supply the electrode active material to the metal-air battery 40, and thus it is possible to improve ease of use of the metal-air battery 40.

The position adjustment section 19b may be two side walls 24 in which a distance therebetween becomes narrower as it is close to the receiving opening 27. For example, the position adjustment section 19b may be provided in a manner similar to the position adjustment section 19b of the attachment section 23 that is included in the metal-air battery 40 illustrated in FIGS. 1, 3, 6, 7, 9, 11 to 13, 15, 16, 17, and 19.

The side wall 24 that constitutes the position adjustment section 19b may be a side wall 24 in which an inclination angle is constant similar to FIG. 1, FIG. 3, and the like, or a side wall 24 in which the inclination angle increases as it becomes closer to the receiving opening 27 similar to FIG. 19.

Figure 15:
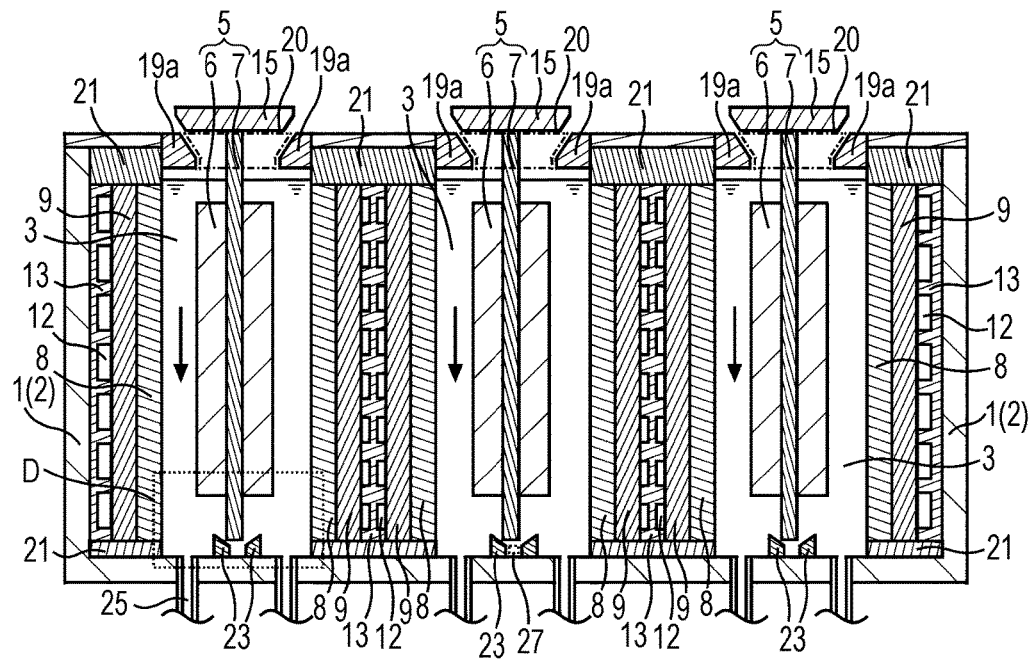
FIG. 15 is a schematic cross-sectional view of the metal-air battery of the embodiment of the invention during insertion of the metallic electrode into the metal-air battery main body.

Here, description will be given of the position adjustment section 19b with reference to FIGS. 15 and 16. In addition, FIG. 15 is a schematic cross-sectional view of the metal-air battery 40 in a state where the metallic electrode 5 of the metal-air battery 40 illustrated in FIG. 7 is further inserted into the inside of the electrolytic tank 2, and FIG. 16 is an enlarged view of a range D surrounded by a dotted line in FIG. 15.

As the metallic electrode 5 is further inserted into the electrolytic tank 2 from the state of the metal-air battery 40 illustrated in FIG. 7, the metallic electrode 5 may come into contact with the inclined side wall 24 (position adjustment section 19b). The side wall 24 is provided in such a manner that a distance between one set of the attachment sections 23 becomes narrower as it becomes closer to the receiving opening 27, and thus the metallic electrode 5 that comes into contact with the position adjustment section 19b slides on the side wall 24 and moves to the central portion of the receiving opening 27. In addition, a portion of the metallic electrode 5, which is to be fitted into the receiving opening 27, moves to a range indicated by h in FIG. 16, and then the metallic electrode 5 is fitted into the receiving opening 27.

As described above, when coming into contact with the side wall 24 that constitutes the position adjustment section 19b, the position of the metallic electrode 5 is adjusted.

Figure 16:
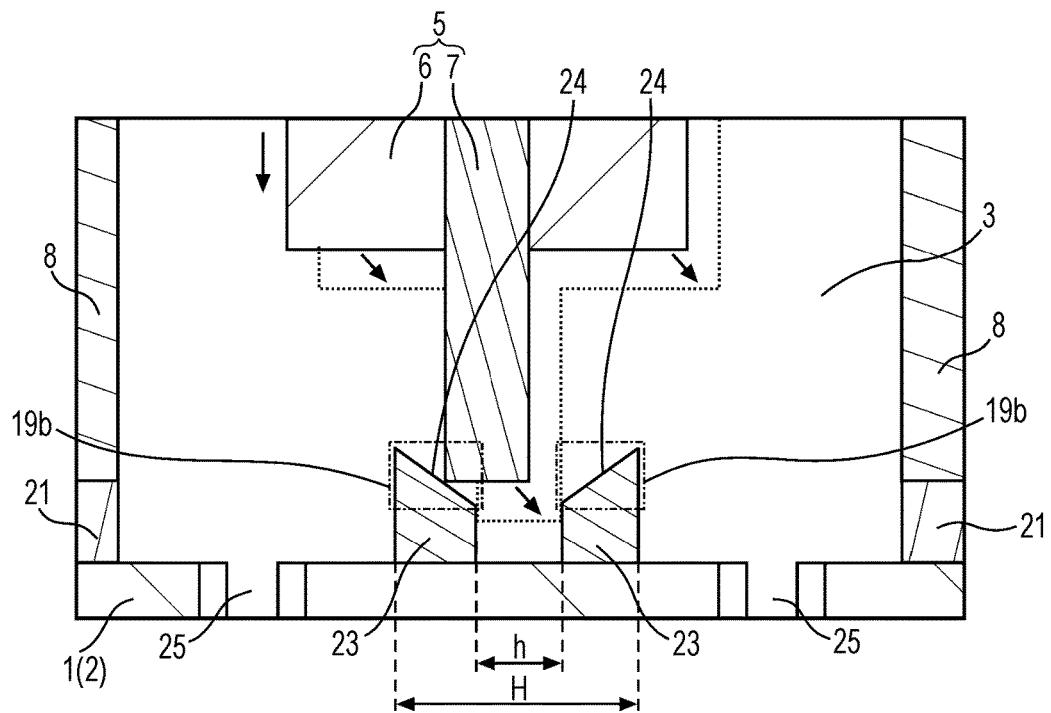
FIG. 16 is a schematic cross-sectional view of the metal-air battery in a range D surrounded by a dotted line of FIG. 15.

Accordingly, when inserting the metallic electrode 5 into the electrolytic tank 2, if the portion of the metallic electrode 5, which is to be fitted into the receiving opening 27, is positioned in the range indicated by H in FIG. 16, the position of the metallic electrode 5 is adjusted by the position adjustment section 19b, and thus the metallic electrode 5 can be fitted into the attachment section 23. As a result, it is possible to fix the metallic electrode 5.

According to this, the metallic electrode 5 can be smoothly attached to the attachment section 23, and it is possible to shorten time taken to supply the electrode active material to the metal-air battery 40, and thus it is possible to improve ease of use of the metal-air battery 40.

In addition, here, description has been given of a case where the attachment section 23 is provided on the bottom of the electrolytic tank 2, and the inclination angle of the side wall 24 is constant. However, even in a case where the attachment section 23 is provided on the side wall of the electrolytic tank 2, it is possible to adjust the position of the metallic electrode 5 by the position adjustment section 19b in a manner similar to the case where the inclination angle of the side wall 24 increases as it becomes closer to the receiving opening 27.

The position adjustment section 19b may be two rollers 29 which constitute the attachment section 23.

Figure 21:
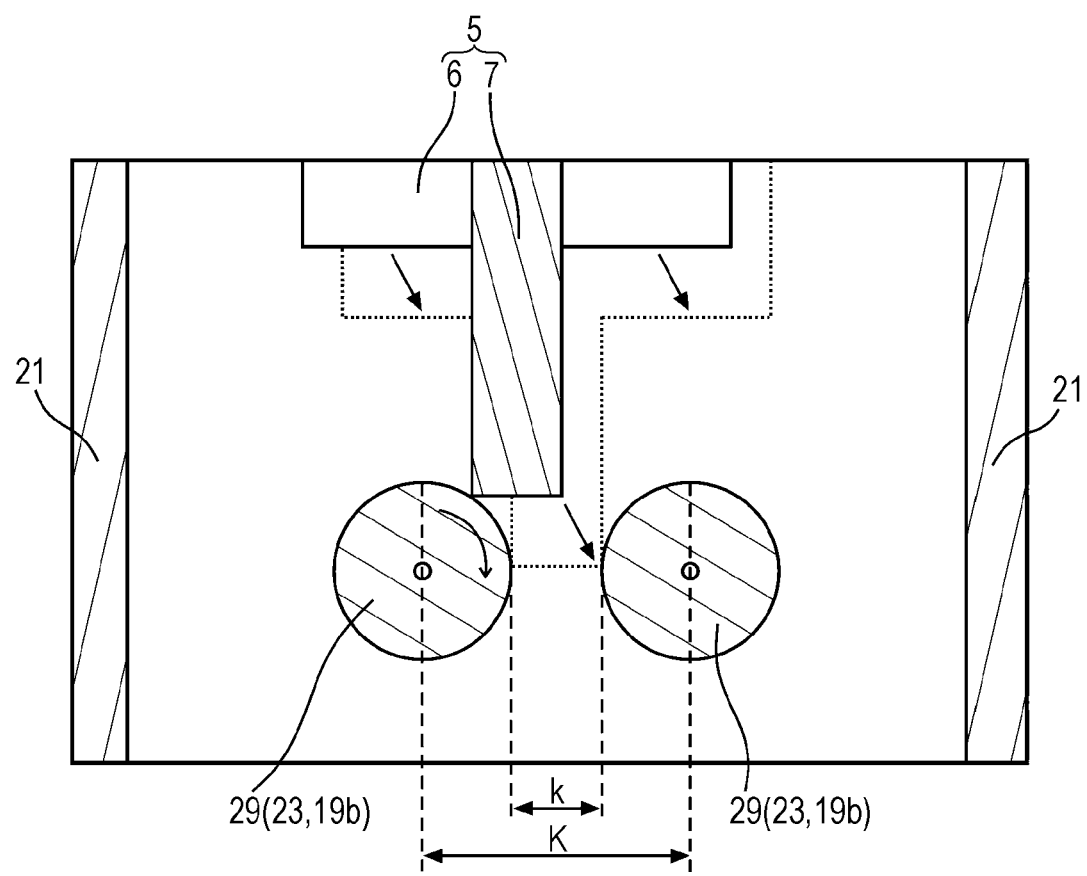
FIG. 21 is a schematic cross-sectional view of a part of the metal-air battery of the embodiment of the invention.

For example, the position adjustment section 19b may be provided similar to the position adjustment section 19b of the attachment section 23 that is included in the metal-air battery 40 illustrated in FIGS. 20 and 21. In addition, FIG. 21 is a schematic cross-sectional view of the metal-air battery 40 in the vicinity of the attachment section 23 during insertion of the metallic electrode 5 into the electrolytic tank 2 in the metal-air battery 40 illustrated in FIG. 20.

Here, the position adjustment section 19b will be described with reference to FIG. 21.

In the metal-air battery 40 illustrated in FIG. 20, as the metallic electrode 5 is inserted into the electrolytic tank 2 of the metal-air battery main body 42, the support member 7, which is included in the metallic electrode 5, may come into contact with the roller 29 (position adjustment section 19b). When the metallic electrode 5 comes into contact with the roller 29, the roller 29 rotates in such a manner that a surface on a receiving opening 27 side moves downwardly. When the roller 29 rotates, the metallic electrode 5, which comes into contact with the roller 29, rotates and moves to the central portion of the receiving opening 27. In addition, a portion of the metallic electrode 5, which is fitted into the receiving opening 27, moves to a range indicated by k in FIG. 21, and then the metallic electrode 5 is fitted into the receiving opening 27.

As described above, when coming into contact with the roller 29 that constitutes the position adjustment section 19*b*, the position of the metallic electrode 5 is adjusted.

Accordingly, when inserting the metallic electrode 5 into the electrolytic tank 2, if the portion of the metallic electrode 5, which is to be fitted into the receiving opening 27, is positioned in the range indicated by K in FIG. 21, the position of the metallic electrode 5 is adjusted by the position adjustment section 19*b*, and thus the metallic electrode 5 can be fitted into the attachment section 23. As a result, it is possible to fix the metallic electrode 5.

According to this, the metallic electrode 5 can be smoothly attached to the attachment section 23, and it is possible to shorten time taken to supply the electrode active material to the metal-air battery 40, and thus it is possible to improve ease of use of the metal-air battery 40.

7. Air Electrode, Ion Exchange Membrane

The air electrode 9 is an electrode serving as a cathode. In the air electrode 9, a hydroxide ion ($OH^-$) is generated from an oxygen gas in the air, water, and an electron. For example, the air electrode 9 is constituted by a conductive porous carrier, and an air electrode catalyst that is carried on the porous carrier. According to this, it is possible to allow an oxygen gas, water, and an electron to coexist on the air electrode catalyst, and thus it is possible to allow an electrode reaction to progress. Water that is used in the electrode reaction may be supplied from the air, or from the electrolytic solution.

In addition, the air electrode 9 may be prepared by applying the porous carrier, on which the air electrode catalyst is carried, to a conductive porous substrate. For example, the air electrode 9 can be prepared by applying carbon, on which the air electrode catalyst is carried, to carbon paper or a carbon felt.

In addition, the air electrode 9 may be provided with a current collecting electrode that collects a charge of the air electrode catalyst. According to this, it is possible to effectively output electric power, which occurs when the metal-air battery 40 generates electricity, to the outside. When a conductive material is used for the flow passage member 13, the flow passage member 13 may be set as a current collecting electrode, or the air electrode 9 may include a current collecting electrode independently from the flow passage member 13. A material of the current collecting electrode is not particularly limited as long as the material has corrosion resistance with respect to the electrolytic solution, and examples of the material include nickel, gold, silver, copper, stainless steel, and the like. In addition, the current collecting electrode may be a conductive substrate and the like which are subjected to a nickel plating treatment, a gold plating treatment, a silver plating treatment, or a copper plating treatment. Iron, nickel, stainless steel, and the like may be used for the conductive substrate.

In addition, a shape of the current collecting electrode may be set to, for example, a sheet shape, a mesh shape, a punching metal, and the like.

In addition, examples of a method of joining the current collecting electrode and the porous carrier or the conductive porous substrate include a method of compressing these components through a frame by using screwing, a method of coupling these components by using a conductive adhesive, and the like.

The air electrode 9, which is included in one cell 4, may be provided only on one side of the metallic electrode 5, or may be provided on both sides of the metallic electrode 5 as illustrated in FIGS. 1 and 2.

Examples of the porous carrier, which is included in the air electrode 9, include carbon black such as acetylene black, furnace black, channel black, and ketjen black, and conductive carbon particles such as graphite and activated charcoal. In addition, carbon fiber such as vapor grown carbon fiber (VGCF), carbon nanotube, and carbon nanowire may be used.

Examples of the air electrode catalyst include fine particles of platinum, iron, cobalt, nickel, palladium, silver, ruthenium, iridium, molybdenum, manganese, a metallic compound thereof, and an alloy containing two or more kinds of these metals. As the alloy, an alloy, which contains at least two or more kinds of platinum, iron, cobalt, and nickel, is preferable, and examples of the alloy include a platinum-iron alloy, a platinum-cobalt alloy, an iron-cobalt alloy, a cobalt-nickel alloy, an iron-nickel alloy, and an iron-cobalt-nickel alloy.

In addition, the porous carrier, which is contained in the air electrode 9, may be subjected to a surface treatment in order for a cation group to exist on a surface of the porous carrier as a fixed ion. According to this, the hydroxide ion can be transmitted through the surface of the porous carrier, and thus movement of the hydroxide ion, which is generated on the air electrode catalyst, becomes easy.

In addition, the air electrode 9 may include an anion exchange resin that is carried on the porous carrier. According to this, the hydroxide ion can be transmitted through the anion exchange resin, and movement of thus the hydroxide ion, which is generated on the air electrode catalyst, becomes easy.

The air electrode 9 may be provided to come into direct contact with the air, or may be provided to come into contact with an air flow passage 12. According to this, it is possible to supply an oxygen gas to the air electrode 9. In addition, in a case of providing the air flow passage 12, it is possible to supply the oxygen gas and water to the air electrode 9 by flowing humidified air to the air flow passage 12. For example, the air, which is supplied to the air flow passage 12, can be supplied from a lateral side of the metal-air battery 40 by using a blower.

For example, the air flow passage 12 may be provided to a flow passage member 13 that is included in the metal-air battery 40 illustrated in FIGS. 1 and 2.

In addition, the flow passage member 13 is made of a conductive material or an insulating material depending on an electrical connection method of respective cells 4.

The air electrode 9 may be provided to come into contact with the electrolytic solution 3 that is stored in the electrolytic tank 2. According to this, the hydroxide ion, which is generated in the air electrode 9, can easily move to the electrolytic solution 3. In addition, it is easy to supply water, which is necessary for the electrode reaction in the air electrode 9, from the electrolytic solution 3 to the air electrode 9.

In addition, the air electrode 9 may be provided to come into contact with the ion exchange membrane 8 that comes into contact with the electrolytic solution 3 stored in the electrolytic tank 2. The ion exchange membrane 8 may be an anion exchange membrane. According to this, the hydroxide ion, which is generated in the air electrode 9, can be transmitted through the anion exchange membrane to move to the electrolytic solution.

When the ion exchange membrane 8 is provided, it is limit ion species which move between the air electrode 9 and the electrolytic solution 3. In a case where the ion exchange membrane 8 is the anion exchange membrane, the anion exchange membrane has a cation group that is a fixed ion, and thus a cation in the electrolytic solution cannot be transmitted to the air electrode 9. In contrast, the hydroxide ion that is generated in the air electrode 9 is an anion, and thus the hydroxide ion can be transmitted to the electrolytic solution. According to this, the battery reaction of the metal-air battery 40 can be progressed, and it is possible to prevent the cation in the electrolytic solution 3 from moving to the air electrode 9. As a result, it is possible to suppress precipitation of a metal or a carbonate compound in the air electrode 9.

In addition, when the ion exchange membrane 8 is provided, it is possible to suppress excessive supply of water contained in the electrolytic solution to the air electrode 9.

Examples of the ion exchange membrane 8 include a perfluorosulfonic acid-based solid polymer electrolyte membrane, a perfluorocarboxylic acid-based solid polymer electrolyte membrane, a styrene vinyl benzene-based solid polymer electrolyte membrane, and a quaternary ammonium-based solid polymer electrolyte membrane (anion exchange membrane).

8. Used Active Material Recovery Mechanism

The metal-air battery 40 may be provided with a used active material recovery mechanism configured to recover the metallic compound precipitate 28 that is generated from the electrode active material due to progress of the battery reaction.

The used active material recovery mechanism is not particularly limited as long as the mechanism is capable of recovering the precipitate 28 in the electrolytic solution, and examples thereof include a mechanism which is provided with an electrolytic solution flow passage 25 configured to circulate the electrolytic solution in the electrolytic tank 2 to recover the precipitate 28 during circulation of the electrolytic solution.

The metal-air battery 40 illustrated in FIG. 1 includes the used active material recovery mechanism that is provided with a precipitation recovery tank 30 and a filtration section 33. This recovery mechanism has a configuration in which the electrolytic solution 3 in the electrolytic tank 2 flows into the precipitation recovery tank 30, and the precipitate 28, which is contained in the electrolytic solution 3 that flows into the precipitation recovery tank 30, settles down in the precipitation recovery tank 30. In addition, after settling-down of the precipitate 28, the electrolytic solution 3 is configured to flow into the electrolytic tank 2 by a pump 31. According to this configuration, it is possible to move the precipitate 28, which precipitates in the electrolytic tank 2, to the precipitation recovery tank 30.

As illustrated in FIG. 1, the precipitate 28, which settles down in the precipitation recovery tank 30, is allowed to flow into the filtration section 33 in combination with the electrolytic solution 3 so as to recover the precipitate 28 as a residue on a filter 34.

Discharging Experiment 1

Figure 22:
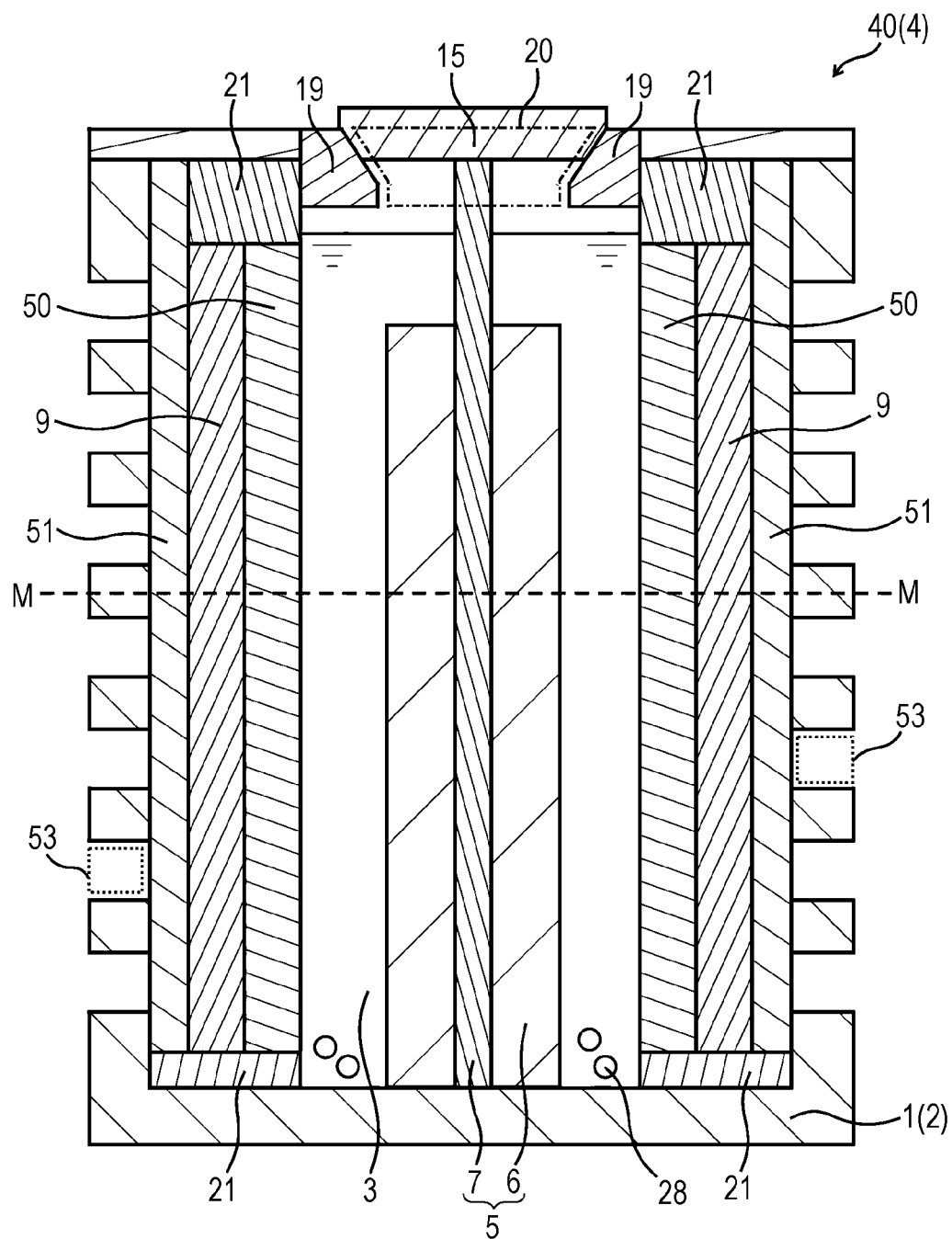
FIG. 22 is a schematic cross-sectional view of the metal-air battery of the embodiment of the invention.

As a metal-air battery of Example 1, a single-cell metal-air battery illustrated in FIG. 22 was prepared, and a discharging experiment was carried out. In addition, as a metal-air battery of Comparative Example 1, the same metal-air battery as the metal-air battery of Example 1 except that the position adjustment section 19 was not provided was prepared, and the discharging experiment was carried out.

A capacity of the electrolytic tank 2 of the metal-air batteries, which were prepared, was set to 50 mL.

Two air electrodes 9 were provided on two facing inner surfaces of the electrolytic tank 2. The air electrode 9 was set to a carbon layer which contains 1 mg/cm$^3$ of Pt catalyst and 20% by weight of PTFE, and has dimensions of 400 μm (thickness)×5 cm (side)×5 cm (side). An electrode area was 50 cm$^2$. In addition, an air electrode current collector 51 configured to collect a charge from the air electrode 9 was provided. A nickel mesh electrode of 60 meshes was used for the air electrode current collector 51. A distance between two air electrodes 9 was set to 16 mm. In addition, a polypropylene separator 50 with a thickness of 30 μm was disposed on each of the air electrodes 9.

The metallic electrode 5 was prepared by providing a metal zinc layer (zinc purity: 99.9%) having dimensions of 5 cm (side)×5 cm (side)×0.5 mm (thickness) as the electrode active material portion 6 on both principal surfaces of a nickel sheet having a thickness of 0.2 mm as the support member 7, respectively. In addition, the cover member 15 made of polyvinyl chloride was attached to the support member 7. In addition, in the metal-air battery of Example 1, an inclined site was provided to the cover member 15 in order for the cover member 15 to be fitted into the electrode insertion opening 20 between the position adjustment sections 19.

In addition, in the metal-air battery of Example 1, the position adjustment sections 19 which were made of polyvinyl chloride were provided to the electrode insertion opening 20 on an upper side of the electrolytic tank 2. Each of the position adjustment sections 19 was set to have the shape illustrated in (a) of FIG. 4, and the inclined side wall 22 was adjusted to be inclined with respect to the horizontal plane by 60°.

In addition, 45 mL of 10 M KOH aqueous solution was put into the electrolytic tank 2, and the metallic electrode 5 that was prepared was inserted into the electrolytic tank 2 from the electrode insertion opening 20, and then discharging was initiated.

In the metal-air battery of Example 1, the position adjustment section 19 served as a guide during insertion of the metallic electrode 5. Accordingly, the metallic electrode 5 smoothly moved into the electrolytic tank 2, and thus an impact on the inclined side wall 22 of the position adjustment section 19 was mitigated. In addition, the cover member 15 having the inclined site was fitted into the electrode insertion opening 20 between the position adjustment sections 19, and thus the metallic electrode 5 was fixed to the center between a pair of air electrodes 9. At this time, a resistance value between a positive electrode and a negative electrode was 61.3 mΩ, and an open circuit voltage was 1.59 V.

In the metal-air battery of Comparative Example 1, since the position adjustment section 19 was not provided, it was confirmed that the electrode active material portion 6 come into contact with the electrolytic tank 2 during insertion of the metallic electrode 5, and was damaged. In addition, in the metal-air battery of Comparative Example 1, the metallic electrode 5 was fixed to a position deviated from the center between the pair of air electrodes 9 toward the air electrode 9 on one side by 6 mm. At this time, the resistance value between a positive electrode and a negative electrode was 59.4 mΩ, and the open circuit voltage was 1.50 V.

Figure 23:
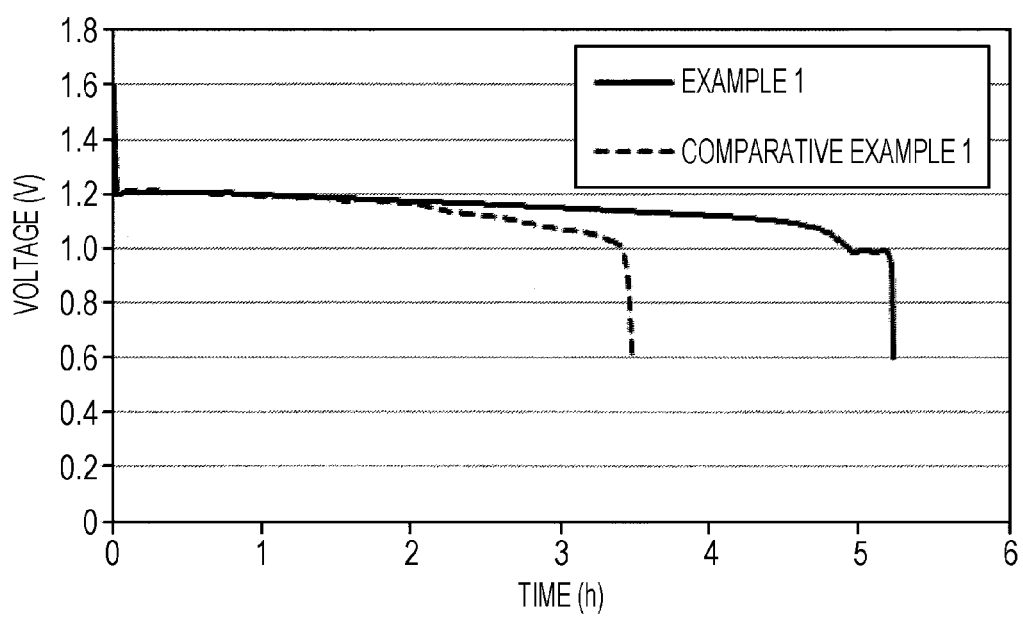
FIG. 23 is a graph illustrating a measurement result of a discharging experiment.

FIG. 23 illustrates measurement results in the discharging experiment that was carried out with respect to the metal-air batteries of Example 1 and Comparative Example 1. In the discharging experiment, a constant current was allowed to flow at a current density of 30 mA/cm$^2$ to measure a voltage.

In the metal-air battery of Example 1, discharging could be performed with a voltage of approximately 1.2 V, the voltage rapidly decreased in a discharging time of approximately 4.9 hours and became less than 0.6 V in a discharging time of approximately 5.2 hours, and thus the discharging experiment was terminated. The discharge capacity of the metal-air battery of Example 1 was 9.0 Wh.

In the metal-air battery of Comparative Example 1, discharging could be performed with a voltage of approximately 1.2 V, the voltage rapidly decreased in a discharging time of approximately 3.3 hours and became less than 0.6 V in a discharging time of approximately 3.5 hours, and thus the discharging experiment was terminated. The discharge capacity of the metal-air battery of Comparative Example 1 was 6.0 Wh.

From the above-described results, it could be seen that when the position adjustment section 19 is provided, it is possible to fix the metallic electrode 5 to approximately the center between the two air electrodes 9, and thus it is possible to suppress damage of the electrode active material portion 6, and it is possible to smoothly and quickly insert the metallic electrode 5 into the electrolytic tank 2.

In addition, in the metal-air batteries of Example 1 and Comparative Example 1, the resistance values between the positive electrode and the negative electrode were not greatly different from each other.

In addition, in the metal-air battery of Example 1, it could be seen that it is possible to output a great discharge capacity in a greater rate in comparison to the metal-air battery of Comparative Example 1.

Discharging Experiment 2

Figure 24:
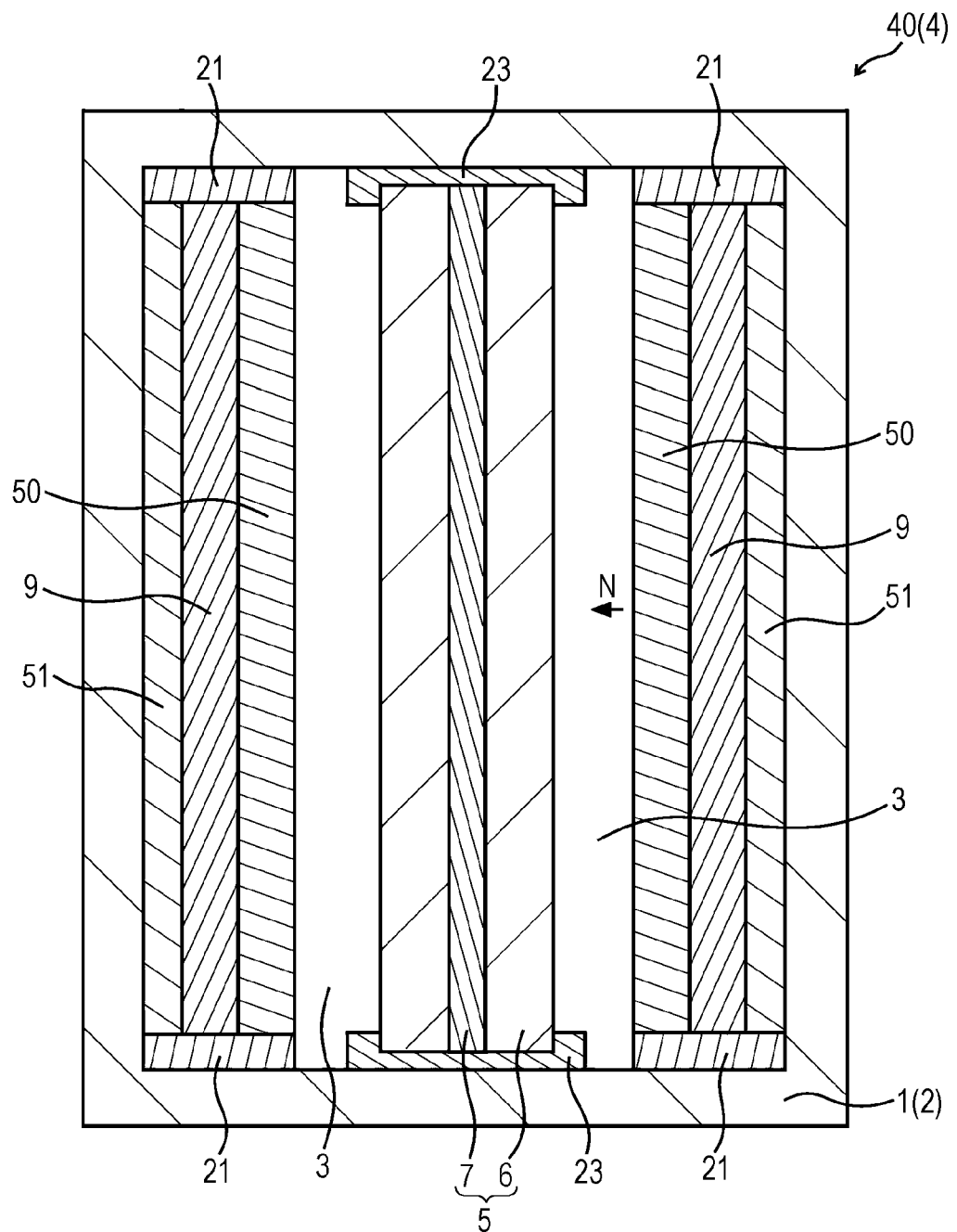
FIG. 24 is a schematic cross-sectional view of the metal-air battery of the embodiment of the invention.
Figure 25:
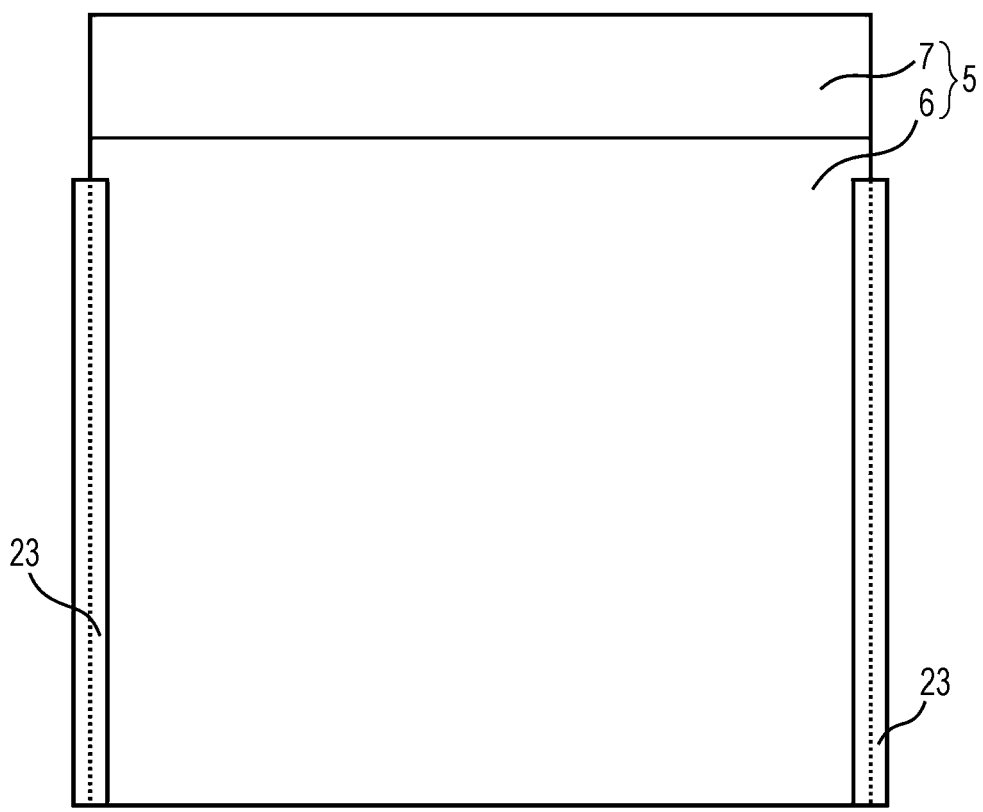
FIG. 25 is an arrow view of a metallic electrode and an attachment section from an arrow N illustrated in FIG. 24.

As a metal-air battery of Example 2, a single-cell metal-air battery illustrated in FIGS. 22, 24, and 25 was prepared, and a discharging experiment was carried out. In addition, FIG. 24 corresponds to a cross-sectional view of a metal-air battery which is taken along broken line M-M in FIG. 22, and FIG. 25 is a schematic arrow view of the metallic electrode 5 and the attachment section 23 which are viewed from an arrow N in FIG. 24. In addition, in the metal-air battery of Example 2, the attachment section 23 was provided, but the attachment section 23 was not provided in the metal-air battery of Example 1.

The metal-air battery of Example 2 was prepared in the same manner as in Example 1 except that the attachment section 23 was provided. As illustrated in FIGS. 24 and 25, the attachment section 23 was provided to cover both lateral side ends of the metallic electrode 5, respectively. In addition, as the material of the attachment section 23, polyvinyl chloride was used.

In addition, as a metal-air battery of Comparative Example 2, the same metal-air battery as in Comparative Example 1 was prepared, and the discharging experiment was carried out. In the metal-air battery of Comparative Example 2, the position adjustment section 19 and the attachment section 23 were not provided.

45 mL of 10 M KOH aqueous solution was put into the electrolytic tank 2, and the metallic electrode 5 was inserted into the electrolytic tank 2 from the electrode insertion opening 20, and then discharging was initiated.

In the metal-air battery of Example 2, the position adjustment section 19 and the attachment section 23 served as a guide during insertion of the metallic electrode 5. Accordingly, the metallic electrode 5 smoothly moved into the electrolytic tank 2. In addition, the lateral side ends of the metallic electrode 5 were covered with the attachment section 23, and thus the metallic electrode 5 was fixed to the center between the pair of air electrodes 9.

In the metal-air battery of Comparative Example 2, when the metallic electrode 5 was inserted into the electrolytic tank 2, the central portion of the metallic electrode 5 was fixed to a position that was deviated from the center between the pair of air electrodes 9 toward the air electrode 9 on one side by 1 mm. In the metal-air battery of Comparative Example 1, the position of the metallic electrode 5 was deviated by 6 mm, but the deviation was 1 mm in Comparative Example 2. The reason for the deviation is considered to be because the position adjustment section 19 and the attachment section 23 were not provided in Comparative Examples 1 and 2, and thus a fixing site of the metallic electrode 5 varied in each insertion of the metallic electrode.

In the discharging experiment, a constant current was allowed to flow at a current density of 30 mA/cm$^2$ to measure a voltage. In the discharging experiment that was carried out with respect to the metal-air battery of Example 2, the discharge capacity was 9.0 Wh. In the discharging experiment that was carried out with respect to the metal-air battery of Comparative Example 2, the discharge capacity was 8.0 Wh.

A surface observation of the metallic electrode 5, which was subjected to the discharging reaction and pulled out from the electrolytic tank 2, was carried out. From the surface observation, it was observed that in Comparative Example 2, metal zinc in an edge portion of the electrode active material portion 6 was consumed preferentially, but in Example 2, the metal zinc was consumed on the principal surfaces of the electrode active material portion 6 in an in-plane uniform manner.

From the above-described results, it could be seen that when the attachment section 23 is provided to cover the lateral side end of the metallic electrode 5, the metallic electrode 5 is fixed in the electrolytic tank 2, and thus it is possible to suppress deformation of the metallic electrode 5. In addition, a fixing position of the metallic electrode 5 in Example 2 was not greatly different from a fixing position of the metallic electrode 5 in Comparative Example 2, but it could be seen that the metal-air battery of Example 2 outputs a great discharge capacity in a greater rate in comparison to the metal-air battery of Comparative Example 2.

REFERENCE SIGNS LIST

1: Case
2: Electrolytic tank
3: Electrolytic solution
4: Cell
5: Metallic electrode
6: Electrode active material portion
7: Support member
8: Ion exchange membrane
9: Air electrode
12: Air flow passage
13: Flow passage member
15: Cover member
18: Roller
19, 19a, 19b: Position adjustment section
20: Electrode insertion opening
21: Insulating member
22: Inclined side wall
23: Attachment section
24: Inclined side wall
25: Electrode solution flow passage
26: Electric wire
27: Receiving opening
28: Metallic compound precipitate
29: Roller
30: Precipitate recovery tank
31: Pump
33: Filtration section 34: Filter
35: Valve
40: Metal-air battery
42: Metal-air battery main body
45: Buffering member
50: Separator
51: Air electrode current collector
53: Vacancy

The invention claimed is:

1. A metal-air battery, comprising:
an electrolytic tank;
an electrolytic solution that is stored in the electrolytic tank;
a metallic electrode that is stored in the electrolytic tank and includes a support member and an electrode active material supported by the support member;
an air electrode that is defined in a portion of a sidewall of the electrolytic tank; and
a first guide that is provided on a portion of the sidewall of the electrolytic tank and that supports the support member, wherein
the electrode active material is separated from the first guide.

2. The metal-air battery according to claim 1, further comprising a plurality of air electrodes on two facing sidewalls of the electrolytic tank respectively, wherein
the first guide is provided in approximately a center between the plurality of air electrodes.

3. The metal-air battery according to claim 2, wherein
the support member is a planar sheet,
the electrode active material is provided on surface of the support member, and
the guide fits an edge of the support member.

4. The metal-air battery according to claim 2, wherein
the electrolytic tank includes an electrode insertion opening through which the metallic electrode is inserted into the electrolytic tank and the metallic electrode is pulling out from the electrolytic tank, and
the metallic electrode further includes a cover member that plugs the electrode insertion opening.

5. The metal-air battery according to claim 4, wherein
the electrode insertion opening is narrower as the electrode insertion opening extends toward an inside of the electrolytic tank, and
a width of the cover member is narrower as the electrode insertion opening extends toward the inside of the electrolytic tank.

6. The metal-air battery according to claim 4, wherein
a sidewall of the electrode insertion opening includes an elastic material, and
when the metallic electrode is in contact with the elastic material, the elastic material is deformed.

7. The metal-air battery according to claim 4, wherein at least two rollers are provided in two facing sidewalls of the electrode insertion opening respectively.

8. The metal-air battery according to claim 4, wherein the electrode insertion opening is in an upper portion of the electrolytic tank.

9. The metal-air battery according to claim 4, wherein the electrode insertion opening is rectangular.

10. The metal-air battery according to claim 1, further comprising a second guide on a bottom of the electrolytic tank, wherein a shape of the second guide is any one of a hole shape, a groove shape, and a slit shape.

11. The metal-air battery according to claim 1, wherein the electrode active material includes metal zinc.

12. The metal-air battery according to claim 1, wherein the support member and the first guide are electrically conductive.

* * * * *